United States Patent
Lesser et al.

(10) Patent No.: US 8,227,551 B2
(45) Date of Patent: Jul. 24, 2012

(54) POLYMERIC COMPOSITIONS, METHODS OF MANUFACTURE THEREOF AND ARTICLES COMPRISING THE SAME

(75) Inventors: Alan James Lesser, Shutesbury, MA (US); Naveen Kumar Singh, Amherst, MA (US); Mohit Mamodia, Chandler, AZ (US)

(73) Assignee: The University of Massachusetts, Boston, MA (US)

( * ) Notice: Subject to any disclaimer, the term of this patent is extended or adjusted under 35 U.S.C. 154(b) by 336 days.

(21) Appl. No.: 12/615,717

(22) Filed: Nov. 10, 2009

(65) Prior Publication Data

US 2010/0286304 A1  Nov. 11, 2010

Related U.S. Application Data

(60) Provisional application No. 61/112,931, filed on Nov. 10, 2008.

(51) Int. Cl.
*C08L 23/00* (2006.01)
*C08L 25/00* (2006.01)
*C08J 3/28* (2006.01)

(52) U.S. Cl. ........ 525/240; 525/241; 525/238; 525/239; 525/903; 526/347; 526/348; 522/157; 522/160; 522/161

(58) Field of Classification Search .................. 525/240, 525/241; 522/150, 157, 161, 160; 526/347, 526/348

See application file for complete search history.

(56) References Cited

U.S. PATENT DOCUMENTS

| | | | |
|---|---|---|---|
| 2,488,112 A | | 11/1949 | Baldwin |
| 4,468,499 A | * | 8/1984 | Siegfried et al. .............. 525/301 |
| 5,676,879 A | * | 10/1997 | Heynderickx et al. ..... 252/299.1 |
| 6,569,915 B1 | * | 5/2003 | Jackson et al. ................ 522/112 |
| 6,960,617 B2 | * | 11/2005 | Omidian et al. .............. 521/102 |
| 7,943,680 B2 | * | 5/2011 | Bowman et al. .................. 522/6 |
| 2009/0088846 A1 | * | 4/2009 | Myung et al. .............. 623/14.12 |
| 2009/0252800 A1 | * | 10/2009 | Wan et al. ..................... 424/488 |

FOREIGN PATENT DOCUMENTS
WO  WO95/26367  10/1995

OTHER PUBLICATIONS

R.D. Andrews, et al. "The Theory of Permanent Set at Elevated Temperatures in Natural and Synthetic Rubber Vulcanizates" Journal of Applied Physics (May 1946) pp. 352-361; vol. 17.

* cited by examiner

*Primary Examiner* — Susan W Berman
(74) *Attorney, Agent, or Firm* — Cantor Colburn LLP

(57) ABSTRACT

Disclosed herein is a polymeric composition comprising a polymeric composition comprising a first crosslinked network; and a second crosslinked network; wherein the first crosslinked network is crosslinked at a first stress and/or a first strain and the second crosslinked network is crosslinked at a second stress and/or a second strain; where the first stress and/or the first strain is different from the second stress and/or the second strain either in magnitude or direction. Disclosed herein is a method comprising subjecting a polymeric mass to a first stress and/or a first strain level; crosslinking the polymeric mass to form a first crosslinked network; subjecting the polymeric mass to a second stress and/or a second strain level; and crosslinking the polymeric mass to form a second crosslinked network; where the first stress and/or the first strain level is different from the second stress and/or the second strain level.

37 Claims, 23 Drawing Sheets

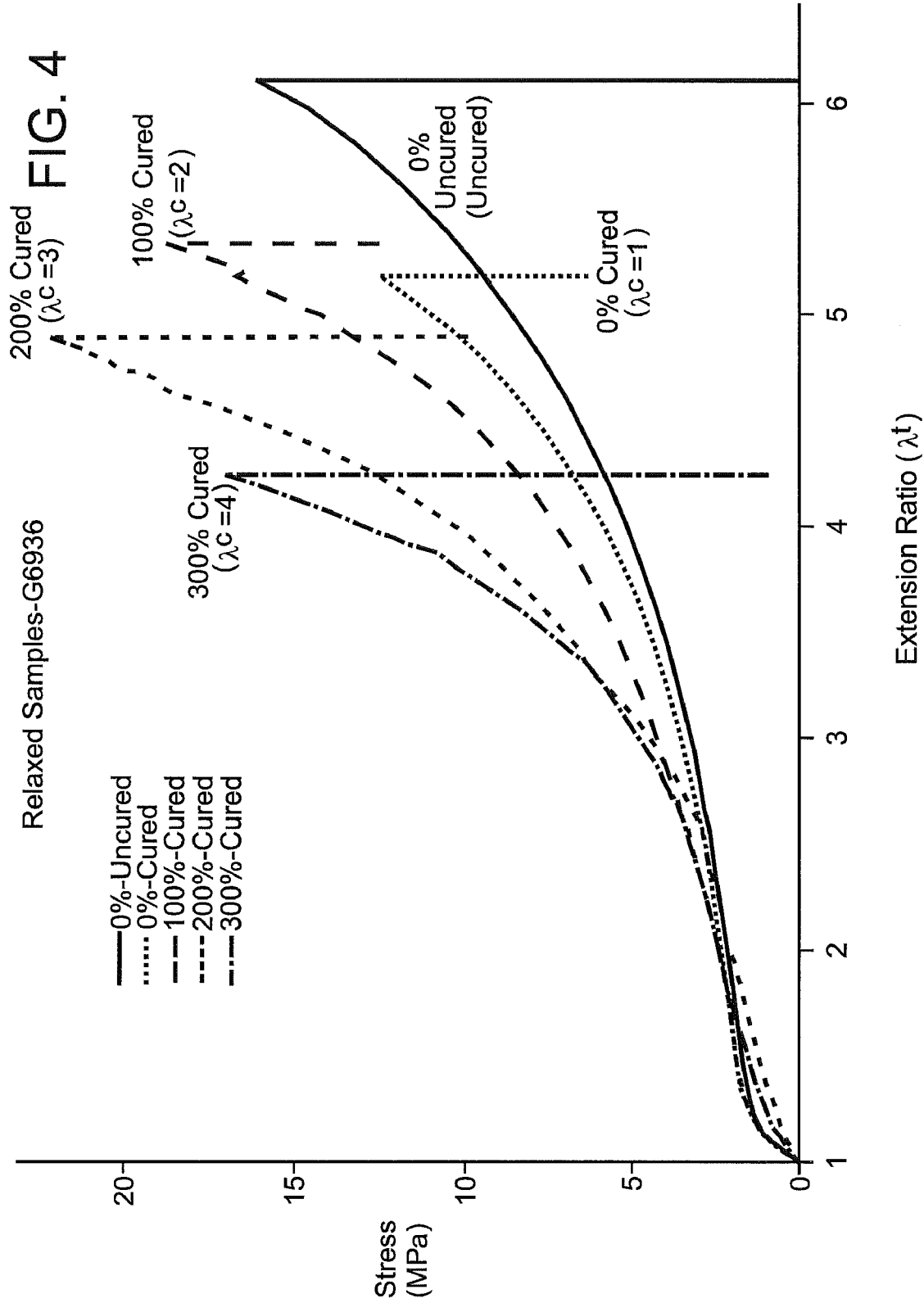

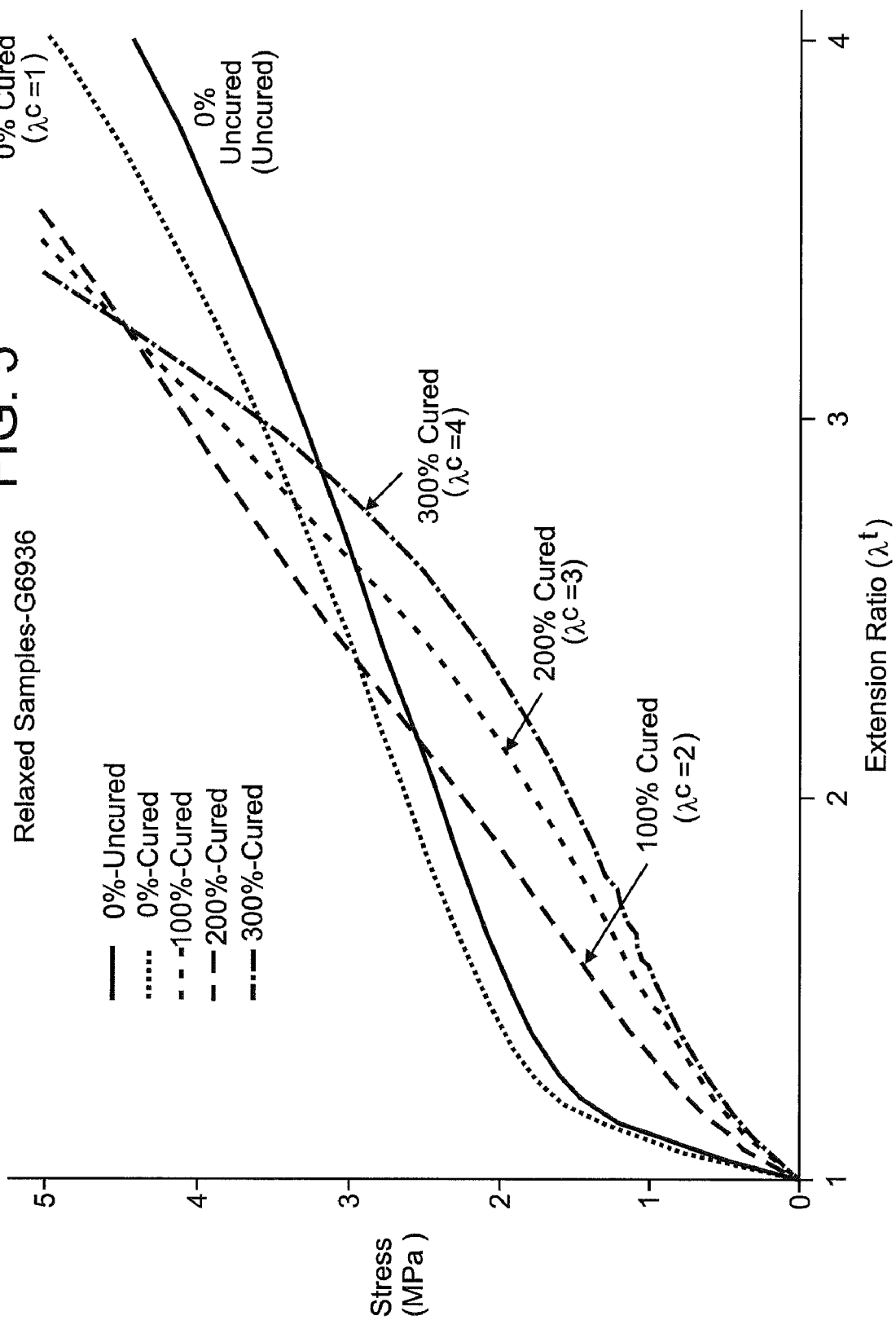

POLYMERIC COMPOSITIONS, METHODS OF MANUFACTURE THEREOF AND ARTICLES COMPRISING THE SAME

CROSS-REFERENCE TO RELATED APPLICATIONS

This application claims priority to provisional application 61/112,931 filed on Nov. 10, 2008, the entire contents of which are hereby incorporated by reference.

BACKGROUND

This disclosure relates to polymeric compositions, methods of manufacture thereof and to articles comprising the same.

Polymeric compositions, especially elastomers and rubbers, are cured by vulcanization and/or other physical crosslinking processes to produce materials that can be deformed to great extensions and recover elastically. When an elastomer recovers its original dimensions it is described as having returned to a state of zero strain or (equilibrium state). A number of properties, including stiffness (modulus), degree of swelling, coefficient of thermal expansion, of elastomers are all strongly affected by the degree of crosslinking produced in the material.

It is well known that the amount of true stress (force per unit instantaneous area, $\sigma_t$) required to stretch an ideal elastomer to an extension $\lambda$ (final length divided by the undeformed length) is calculated from equation (1) below:

$$\sigma_t = G_r \left[ \lambda^2 - \frac{1}{\lambda} \right] \quad (1)$$

where $G_r$ is the shear modulus. It is also known that the shear modulus of an ideal elastomer or rubber is related its crosslink density by the relationship expressed in equation (2):

$$G_r = \frac{\rho RT}{M_c} \quad (2)$$

The elasticity of an elastomer is due to entropic changes in the molecules when the elastomer is subjected to stress. These entropic changes result in a transfer of heat between the elastomer and its surroundings. For example when an elastomer is stretched (e.g., loaded) heat is transferred from the elastomer to its surroundings. Conversely, when the elastomer is unloaded, heat is absorbed by the elastomer from its surroundings. The transfer of heat between the elastomer and its surroundings occurs by diffusion, which can take time because of the relatively low thermal conductivity of these materials. This results in hysteretic heating during cyclic loading. Hysteretic heating has a number of detrimental effects that can include premature failure in cyclic applications, increased permanent set (i.e., loss of recoverable elasticity), and energy loss through dissipation. These detrimental properties of elastomers lead to increased material costs and to increased maintenance costs when elastomers are used in commercial applications where they are subjected to cyclic loading.

Extensive research and development has therefore been directed toward improving the properties of elastomers. For example, a reduced coefficient of thermal expansion and degree of swelling can be obtained by increasing the crosslink density of the elastomer, but this comes at a cost of increased stiffness (modulus) and a corresponding reduction in elongation to break and potentially strength. Fillers like carbon black and other particles have been used to overcome some of these tradeoffs, but they have all shown to increase the hysteresis of the material and make the rubber more difficult to process.

It is therefore desirable to develop polymeric compositions with a unique balance of properties between tensile strength, toughness, impact resistance, tear strength, flex resistance, reduced hysteresis, fatigue, longer service life and resistance to swelling amongst other properties. For example, many seal applications could us a low modulus (soft) elastomer that has a very low coefficient of thermal expansion and a very low degree of swelling. With conventional curing and processing techniques, simultaneously achieving all of these properties is not possible.

SUMMARY

Disclosed herein is a polymeric composition comprising a first crosslinked network; and a second crosslinked network; the first crosslinked network and the second crosslinked network being in operative communication with one another; wherein the first crosslinked network is crosslinked at a first stress and/or a first strain and the second crosslinked network is crosslinked at a second stress and/or a second strain; where the first stress and/or the first strain is different from the second stress and/or the second strain either in magnitude or direction; and further wherein either the first crosslinked network or the second crosslinked network has physical crosslinks.

Disclosed herein is a method comprising subjecting a polymeric mass to a first stress and/or a first strain level; crosslinking the polymeric mass to form a first crosslinked network; subjecting the polymeric mass to a second stress and/or a second strain level; and crosslinking the polymeric mass to form a second crosslinked network; where the first stress and/or the first strain level is different from the second stress and/or the second strain level.

Disclosed herein is a polymeric composition comprising a first crosslinked network; and a second crosslinked network; the first crosslinked network and the second crosslinked network being in operative communication with one another; wherein the first crosslinked network is crosslinked at a first stress and/or a first strain and the second crosslinked network is crosslinked at a second stress and/or a second strain; where the first stress and/or the first strain is different from the second stress and/or the second strain either in magnitude or direction; and where the first strain and the second strain can be compressive strain, a shear strain and or a tensile strain that is greater than or equal to about 450%.

The above-described and other embodiments are described in further detail below.

BRIEF DESCRIPTION OF THE DRAWINGS

Referring now to the Figures, which are exemplary embodiments:

FIG. 4 depicts the stress-strain curves for KRATON® GRP6936 SEBS styrene-ethylene/butylene-styrene thermoplastic elastomer crosslinked at elongations of 0, 100, 200, and 300%; and FIG. 5 depicts the stress-strain curves for KRATON® GRP6926 SEBS styrene-ethylene/butylene-styrene thermoplastic elastomer crosslinked at elongations of 0, 100, 200, and 300%.

FIG. 6 is a graph showing the percentage transmission versus the wavenumber ($cm^{-1}$) when the crosslinked networks are subjected to infrared measurements. FIG. 6(A) show the infrared data for the styrene-ethylene-co-butylene-styrene tri-block copolymer while

FIG. 7 is a graph showing uniaxial stress versus $\lambda^r$ curves for the styrene-ethylene-co-butylene-styrene tri-block copolymer polymeric composition systems. FIG. 7(A) shows tensile full stress extension results while

FIG. 8 is a graph showing uniaxial stress versus $\lambda^r$ curves for the ethylene-co-propylene-diene-monomer polymeric composition systems. FIG. 8(A) shows tensile full stress extension results while

DETAILED DESCRIPTION

Figure 1:
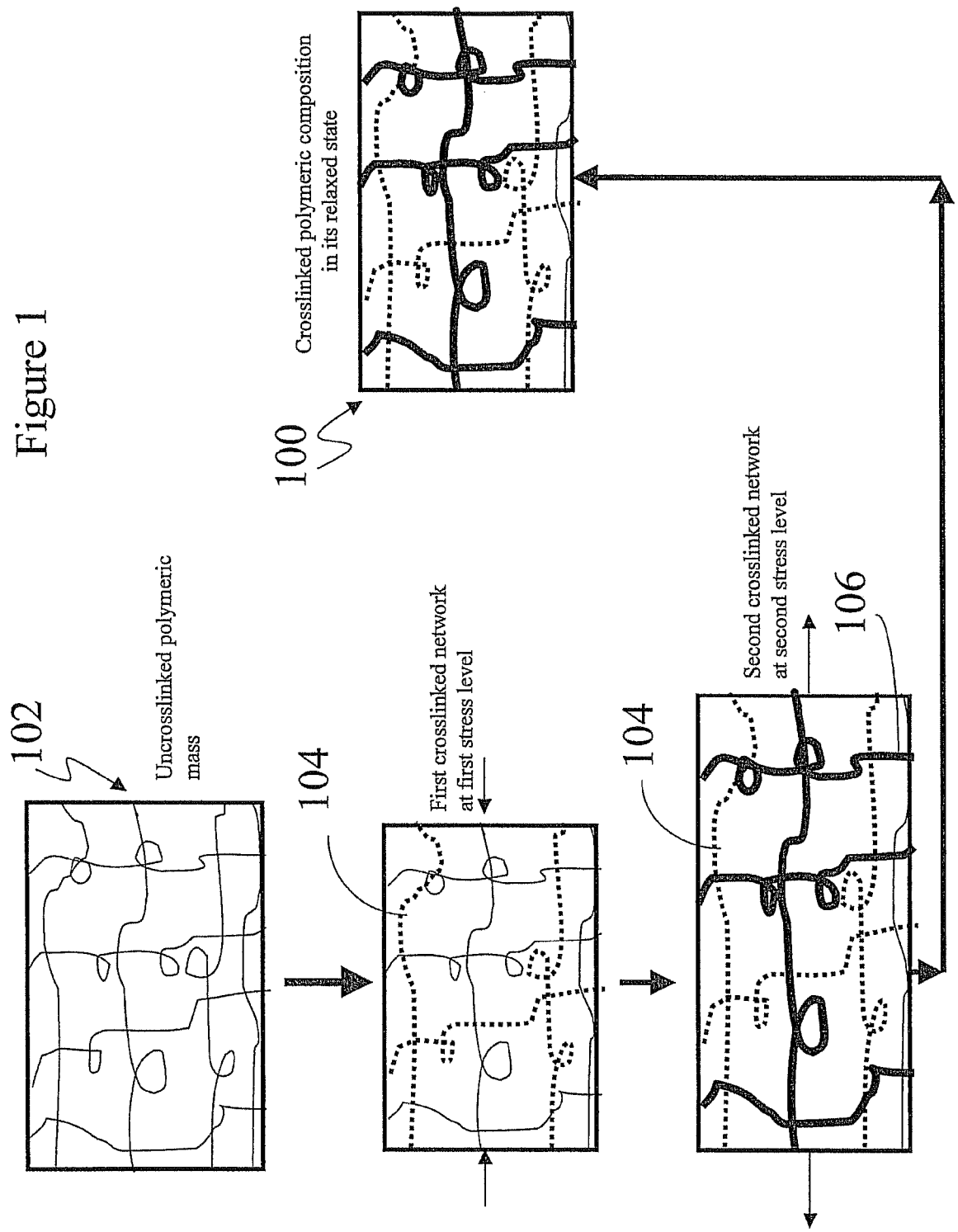
FIG. 1 depicts one exemplary method of manufacturing the polymeric composition, where the first crosslinked network and the second crosslinked network are interpenetrating networks.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations, which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles, which are illustrated, may be rounded. Thus, the regions illustrated in the figures are schematic in nature and their shapes are not intended to illustrate the precise shape of a region and are not intended to limit the scope of the present invention.

The transition phrase "comprising" encompasses the transition phrases "consisting of" and "consisting essentially of".

Disclosed herein are polymeric compositions that comprise a plurality of competitive networks. The competitive networks are formed by subjecting an un-crosslinked polymeric mass to crosslinking while being subjected to different stress and/or strain levels. Because each network in the polymeric composition is formed at a different strain level, each network possesses a different state of zero strain (equilibrium state). As a result, when the resulting polymeric composition is being subjected to a stress, one of the networks is being subjected to loading while the other is simultaneously unloading. Thus, when the polymeric composition is deformed, one of the networks is releasing heat, while another network is absorbing heat, thus providing for a lower net heat exchange with the surroundings. This opposing response of the respective networks to the application of a stress has engendered the use of the term "competitive networks".

While it has been stated that respective networks of the polymeric composition act in opposition to one another upon being deformed, there are certain levels of deformation at which the respective networks can act in concert with one another. These will be detailed later.

Polymeric compositions that have competitive networks display an improved balance of properties between tensile strength, toughness, impact resistance, tear strength, flex resistance, reduced hysteresis, fatigue, longer service life, resistance to swelling amongst and a variety of other properties over other comparative commercially available polymeric compositions that do not contain competitive networks. In one exemplary embodiment, the polymeric compositions display this improved balance of properties when they function as elastomers (i.e., they display an elastic modulus of about $10^5$ Pascals (Pa) to about $10^8$ Pa.

In another exemplary embodiment, the polymeric composition displays this improved balance of properties when stressed within the limits of neo-Hookean elasticity.

In one embodiment, each network of the polymeric composition competes against the other networks in at least one property and thus enables the competitive network to display a different value of that property from other comparative commercially available polymeric compositions that do not have the competitive networks. In another embodiment, each network of the polymeric composition competes against the other networks in a plurality of different properties and thus enables the competitive network to display different values for the plurality of different properties from other comparative commercially available polymeric compositions that do not have the competitive networks.

The polymeric composition can comprise a plurality of competitive networks. For example, the polymeric composition can have 2, 3, 4, 5 or more networks. In one embodiment, the plurality of competitive networks are interpenetrating networks. In another embodiment, the plurality of competitive networks are in operative communication with one another but are not interpenetrating networks. In yet another embodiment, the plurality of competitive networks can comprise a first plurality of competitive interpenetrating networks that are in operative communication with a second plurality of competitive networks that are not interpenetrating networks. In yet another embodiment, the plurality of competitive networks can comprise a first plurality of competitive interpenetrating networks that are in operative communication with a second plurality of competitive interpenetrating networks. Operative communication as described herein refers to the fact that a function performed on one network induces an "effect in another network". In one embodiment, the "effect in another network" is a competitive effect. The networks that are in operative communication with one another can also be in physical communication with one another.

In one embodiment, an infinite number of networks can be formed by subjecting the polymeric mass to a continuously varying stress while simultaneously subjecting it to crosslinking. An example of such a polymeric composition can be found when a polymeric mass is subjected to calendaring in a roll mill where the deformation and crosslinking occur simultaneously.

With reference now to the FIG. 1, in one method of manufacturing the polymeric composition 100, an uncrosslinked polymeric mass 102 comprising polymeric repeat units is stressed to a first stress and/or a first strain level and subjected to crosslinking that permits the formation of a first crosslinked network 104 (shown in dotted lines) having a first crosslink density. It should be noted that a special case of this first step may involve no application of stress or strain (i.e., zero stress or strain) during the formation of the first network. After the formation of the first crosslinked network, the polymeric mass is subjected to a second stress and/or a second strain level and subjected to crosslinking that permits the formation of a second crosslinked network 106 (shown in bolded lines) having a second crosslink density. Following the formation of the two (or more) crosslinked networks, the polymeric composition 100 is released from its stressed state and is allowed to relax to a new equilibrium state where each individual network in envisioned to be strained against one-another. In an exemplary embodiment, the first crosslinked network 104 and the second crosslinked network 106 are interpenetrating networks.

The polymeric composition 100 can comprise thermoplastic polymers, thermosetting polymers, blends of thermoplastic polymers, blends of thermosetting polymers and blends of thermoplastic polymers with thermosetting polymers. The polymeric composition can comprise homopolymers, copolymers, ionomers, dendrimers, or the like, or a combination comprising at least one of the foregoing polymers.

In one embodiment, the polymeric composition can comprise polymers that have glass transition temperatures below room temperature so that the first crosslinked network 104 and the second crosslinked network 106 would both display elastomeric behavior at room temperature. In another embodiment, the polymeric composition can comprise a polymer that has a glass transition temperature above room temperature so that the polymer is in its glassy state at room temperature. In yet another embodiment, the polymeric composition can comprise only polymers that have a glass transition temperature above room temperature. In this event, the polymeric composition will display its elastomeric properties at a temperature that is greater than the glass transition temperature of the first crosslinked network and/or the second crosslinked network. Room temperature is defined as being 23° C.

The first crosslinked network 104 and the second crosslinked network 106 can be chemically or physically crosslinked networks. In a chemically crosslinked network, the crosslink junctions are formed by chemical covalent bonds. These bonds are not thermally reversible i.e., the bond does not cease to exist until it is degraded (when the temperature of the network is increased). An example of a chemically bonded network is crosslinked polybutadiene, crosslinked polyisoprene, or the like.

In a physically crosslinked network, the crosslinked junctions are thermally reversible. Thermally reversible crosslink junctions are produced by the entrapping of neighboring polymer chains by domains in their solid state. The domains begin to flow upon heating to a temperature above the glass transition temperature of the domain or the melting point of the crystals present in the domain. Upon cooling, these domains begin to revert to their solid state and entrap neighboring polymer chains thereby forming an elastomer. Examples of thermally reversible crosslinks are ionomer domains, crystalline domains, glassy domains, and combinations comprising at least one of the foregoing glassy domains. An example of a physically crosslinked network is one obtained from a styrene-butadiene-styrene block copolymer, where the styrene blocks form the glassy domains.

In one embodiment, the first crosslinked network 104 and the second crosslinked network 106 can be physically crosslinked networks. In another embodiment, the first crosslinked network 104 and the second crosslinked network 106 can be chemically crosslinked networks. In yet another embodiment, the first crosslinked network 104 can be a physically crosslinked network, while the second crosslinked network 106 can be a chemically crosslinked network. In yet another embodiment, the first crosslinked network 104 and the second crosslinked network 106 can each comprise a physically crosslinked network and a chemically crosslinked network.

Thermoplastic elastomers are examples of physically crosslinked networks. Examples of thermoplastic elastomers are styrenic block copolymers, polyolefin blends, elastomeric alloys, thermoplastic polyurethanes, thermoplastic copolyesters, thermoplastic polyamides, or the like, or a combination comprising at least one of the foregoing thermoplastic elastomers.

Thermoplastic elastomers are generally block copolymers comprising at least one crystalline, or hard block and at least one rubbery, or soft block. The hard block and soft block are denoted A and B, respectively. Thus thermoplastic elastomers are generally of structure A-B-A or $(A-B)_n$. Examples of hard blocks are polystyrene, poly(alpha-methylstyrene), polyurethane, polyester, polycarbonate, polysulfone, poly(silphenylene siloxane), or the like, or a combination comprising at least on of the foregoing hard blocks. Examples of soft blocks are polybutadiene, polyisoprene, a copolymer of ethylene and butylene, polydimethylsiloxane, polyester, polyether, or the like, or a combination comprising at least on of the foregoing soft blocks. Using a coupling agent, for example, divinylbenzene, silicon tetrachloride, or phosphorous trichloride, at the end of a polymerization to tie several polymer chains together, can produce star or radial thermoplastic elastomers.

Examples of thermoplastic elastomers are styrene-butadiene-styrene (SBS), styrene-isoprene-styrene (SIS), or styrene-ethylene/butylene-styrene (S-EB-S) block copolymers; thermoplastic polyurethanes; copolyester-ethers (block copolymers derived from terephthalic acid, polytetramethylene glycol, and 1,4-butanediol), or the like, or a combination comprising at least on of the foregoing block copolymers.

Thermoplastic polyurethane elastomers (TPU's) are derived from three components: a linear, hydroxyl-terminated polyol; a diisocyanate; and a low molecular weight diol, which serves as a chain extender. The polyol can be a polyester polyol or a polyether polyol with a molecular weight of about 500 to about 3500 grams per mole. The polyester polyol can be based on, for example, adipic acid, azelaic acid, isophthalic acid, or caprolactone. The polyether polyol can be, for example, polypropylene glycol or polytetramethylene glycol (PTMEG). Examples of diisocyanates are diphenylmethan-4,4'-diisocyanate (MDI), toluene-2,4-diisocyanate (TDI), dicyclohexylmethane-4,4'-diisocyanate ($H_{12}$MDI). Examples of low molecular weight diols are ethylene glycol, 1,4-butanediol, and 1,4-phenylene-bis(2-hydroxyethyl)ether.

Examples of polyolefin elastomers are elastomer-hard thermoplastic blends. The component polymers are blended together under conditions of intense shear to give a fine dispersion of the two phases. The elastomer is generally EP (ethylene/propylene) or EPDM (ethylene/propylene/diene) rubbers, and the hard thermoplastic is generally polypropylene.

Examples of commercially available thermoplastic elastomers are STYROFLEX® (BASF), KRATON® (Shell chemicals), PELLETHANE® (Dow chemical), PEBAX®, ARNITEL® (DSM), HYTREL® (Du Pont), SANTOPRENE® (Advanced Elastomer Systems), GEOLAST® (Advanced Elastomer Systems) and ALCRYN® (Du Pont).

Examples of suitable chemically crosslinked networks natural rubber (NR), synthetic polyisoprene (IR), butyl rubber (copolymer of isobutylene and isoprene, IIR), halogenated butyl rubbers (chloro butyl rubber: CIIR; bromo butyl rubber: BIIR), polybutadiene (BR), styrene-butadiene rubber (copolymer of polystyrene and polybutadiene, SBR), nitrile rubber (copolymer of polybutadiene and acrylonitrile, NBR), hydrogenated nitrile rubbers (HNBR), chloroprene rubber (CR), polychloroprene, EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone Rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA), or the like, or a combination comprising at least one of the foregoing chemically crosslinked networks.

Examples of commercially available chemically crosslinked networks are VITON® (Du Pont), TECHNOFLON® (Solvay), FLUOREL® (3M), AFLAS® (Asahi), HYPALON® (Du Pont), CHEMRAZ® (Green Tweed) and PERLAST® (Precision Polymer Engineering).

With reference now again to the FIG. 1, the first strain level and the second strain level can be any desired amount. Strain is defined as a ratio of the change in elongation to the original elongation. The strain can be the result of a compressive stress, an elongational stress, a shear stress, or a combination comprising at least one of the foregoing stresses. The stresses can be uniaxial or multiaxial (e.g., biaxial, triaxial, and so on). In one embodiment, when the strain is the result of a tensile stress or a shear stress, the first strain level or the second strain level can be an amount of up to about 1,000%, specifically about 1 to about 500%, and more specifically an amount of about 10 to about 100%. In another embodiment, when the strain is the result of a compressive stress, the first strain level or the second strain level can be an amount of up to about 90%, specifically about 1 to about 80%, and more specifically about 10 to about 70%. It is to be noted that the first strain level is always different from the second strain level. The first strain level can be 0%. In other words, the first network can be formed without the polymeric mass being subjected to any stress or strain.

In one embodiment, the first crosslinked network and the second crosslinked network are subjected to crosslinking while being subjected to stresses that are applied in opposing directions. For example, the first crosslinked network can be formed under a compressive stress while the second crosslinked network can be formed under a tensile stress.

In one embodiment, when all crosslinked networks in the polymeric composition are chemically crosslinked networks, the minimum tensile strain level for the formation of any crosslinked network is greater than 400%, specifically greater than or equal to about 450%, more specifically greater than or equal to about 500%, and even more specifically greater than or equal to about 550%. In another embodiment, when all crosslinked networks in the polymeric composition are chemically crosslinked networks, the polymeric mass can be subjected to a first strain level and/or a second strain level that is brought about by a compressive stress, a shear stress, a tensile stress that is greater than or equal to about 450%, or a combination comprising at least one of the foregoing stresses. The stresses can be applied uniaxially or multiaxially.

The chemically crosslinked networks can be achieved by the use of chemical curing agents, electron beam crosslinking, ultraviolet crosslinking, microwave crosslinking, X-ray crosslinking, gamma ray crosslinking, thermally induced crosslinking, or the like, or a combination comprising at least one of the foregoing methods of crosslinking.

Examples of chemical curing agents are sulfur, a peroxide, an accelerator, or a combination comprising at least one of the foregoing curing agents. The use of sulfur to crosslink the polymeric composition is referred to as vulcanization, semi-efficient vulcanization (SEV), or efficient vulcanization (EV), depending upon the ratio of sulfur to accelerator. The use of peroxide to crosslink the polymeric composition is referred to as peroxide curing.

Examples of peroxides are dialkyl peroxides, peroxyketals, diacyl peroxides, and peroxyesters, or the like, or a combination comprising at least one of the foregoing peroxides. An exemplary peroxide is dicumyl peroxide. Examples of accelerators are dithiocarbamates, guanidines, sulfenamides, thiazoles, thioureas, thiurams, and xanthate esters. Specific examples of accelerators are thiocarbanalide, morpholino-2-benzothiazole disulfide, N-t-butyl-2-benzothiazole sulferamide, 2-mercaptobenzothiazole, benzothiazyl disulfide, tetramethylthiuram monosulfide, N-oxydiethylene-2-benzothiazole sulfenamide, or N,N'-diphenylguanidine, or the like, or a combination comprising at least one of the foregoing accelerators. Stearic acid and zinc oxide can be used in combination to accelerate cure.

Physically crosslinked networks are generally achieved by heating the polymeric mass above the melting point of semi-crystalline polymers or above the glass transition temperature of amorphous polymers and then cooling the mass to below the melting point or the glass transition temperature of the polymers respectively.

Depending on the end use application, the polymeric composition can be compounded with a variety of additives including fillers, processing oils, plasticizers, tackifying resins, impact modifiers, mold release agents, anti-oxidants, anti-ozonants, or the like, or a combination comprising at least on of the foregoing materials. Examples of fillers are carbon black, calcium carbonate, silica, silicate, clay, kaolin, or the like, or a combination comprising at least one of the foregoing fillers. Examples of tackifying resins are rosin esters, pine tar, pinene resins, synthetic terpene resins, or the like.

In one embodiment, in one method of manufacturing the polymeric composition, a polymeric mass is subjected to a first stress to a reach a first strain level. A portion of the crosslinks in the polymeric composition is then subjected to crosslinking by either subjecting them to vulcanization, to irradiation or to heating followed by cooling (to encourage crystallization or phase separation) to form the first crosslinked network. In one embodiment, the first stress may not be applied to the polymeric composition and the polymeric mass may be subjected to crosslinking without the application of any stress. In other words the stress and/or strain are equal to zero during the crosslinking to form the first crosslinked network. In one embodiment, the polymeric composition comprises a physically crosslinked network when the first crosslinked network is formed at a stress level and/or a strain level of zero.

Following the formation of the first crosslinked network, the polymeric mass is then subjected to a second stress to reach a second strain level, upon which the polymeric mass is once again subjected to crosslinking. It is generally desirable for the stress level and/or the strain level to be greater than zero, or less than zero when the first crosslinked network and the second crosslinked network contain only chemical crosslinks.

In one embodiment, the sequential crosslinking of the first crosslinked network 104 and the second crosslinked network 106 results in the formation of two interpenetrating networks. It is to be noted that while the description above relates to the formation of two interpenetrating networks at two different stress and/or strain levels, it is possible to form a plurality of networks at a plurality of different stresses and/or strain levels.

Figure 2:
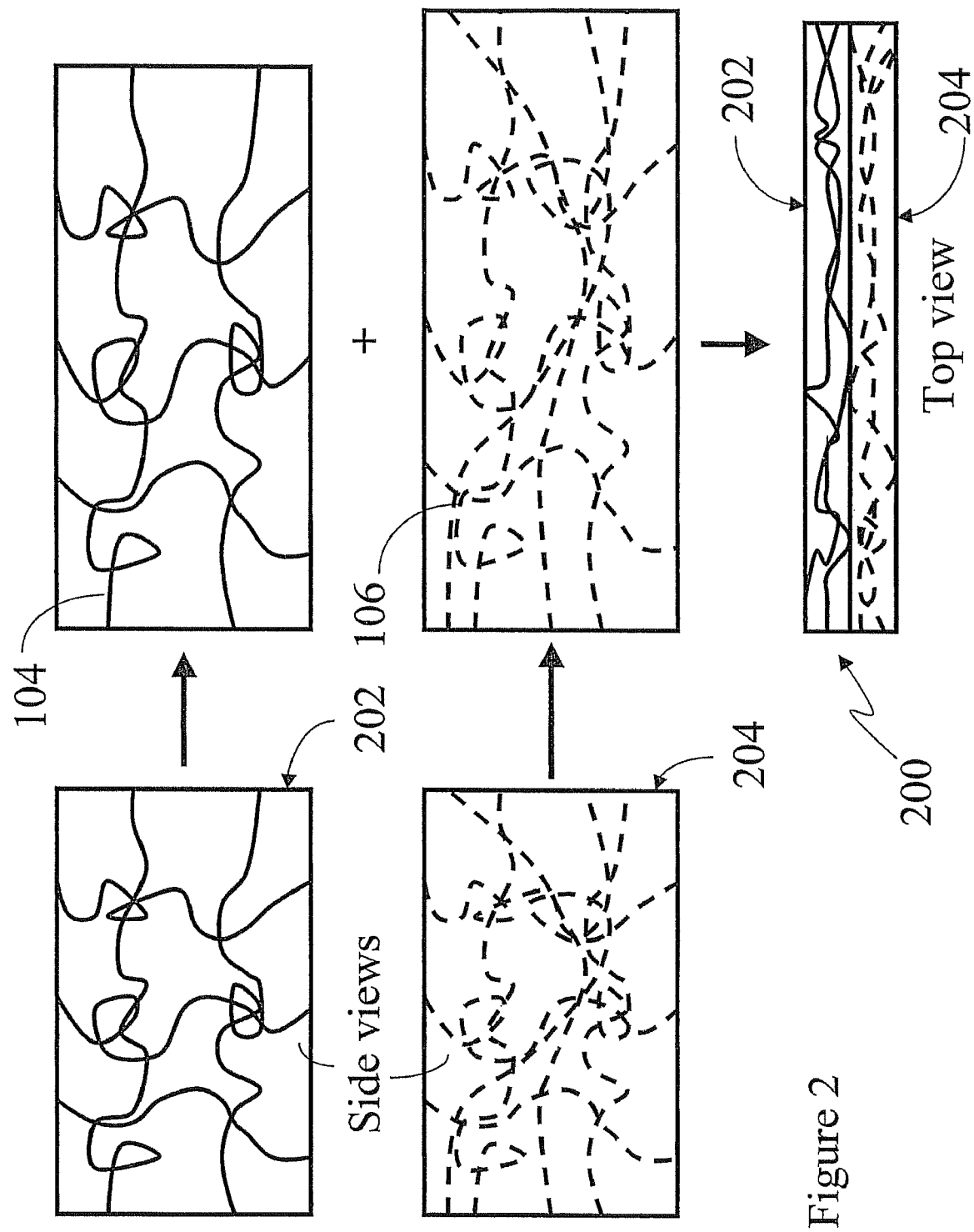
FIG. 2 depicts one exemplary method of manufacturing the polymeric composition, where the first crosslinked network and the second crosslinked network are not interpenetrating networks.

In another embodiment, in another method of manufacturing the polymeric composition 200 depicted in the FIG. 2, two slabs of a polymeric mass—a first polymeric mass 202 and a second polymer mass 204 are subjected to crosslinking separately. The first polymeric mass 202 is subjected to crosslinking at a first stress and/or a first strain level to form the first crosslinked network 104, while the second polymeric mass 204 is subjected to crosslinking at a second stress and/or a second strain level to form the second crosslinked network 106. In one embodiment, the first stress and/or first strain level is different from the second stress/and or the second strain level in either magnitude or direction. The first polymeric mass 202 can then be bonded to the second polymeric mass 204 to form the polymeric composition 200 as shown in the FIG. 2. In one embodiment, the bonding can be accomplished by laminating the crosslinked networks in a roll mill. In another embodiment, the bonding can be accomplished by applying a layer of adhesive at the interface of the two layers. The polymeric composition 200 shown in the FIG. 2 is a top view, while the views of the polymeric masses 202 and 204 prior to bonding are side views. In the FIG. 2, the first crosslinked network 104 is in physical communication with the second crosslinked network 106, but the two networks are not interpenetrating networks. The FIG. 2 reflects two crosslinked networks that are in intimate contact with one another, such that a first face of the first crosslinked network is opposedly disposed to a first face of the second crosslinked network. In one embodiment, the plurality of layers can be arranged in a multilayered form.

Figure 3:
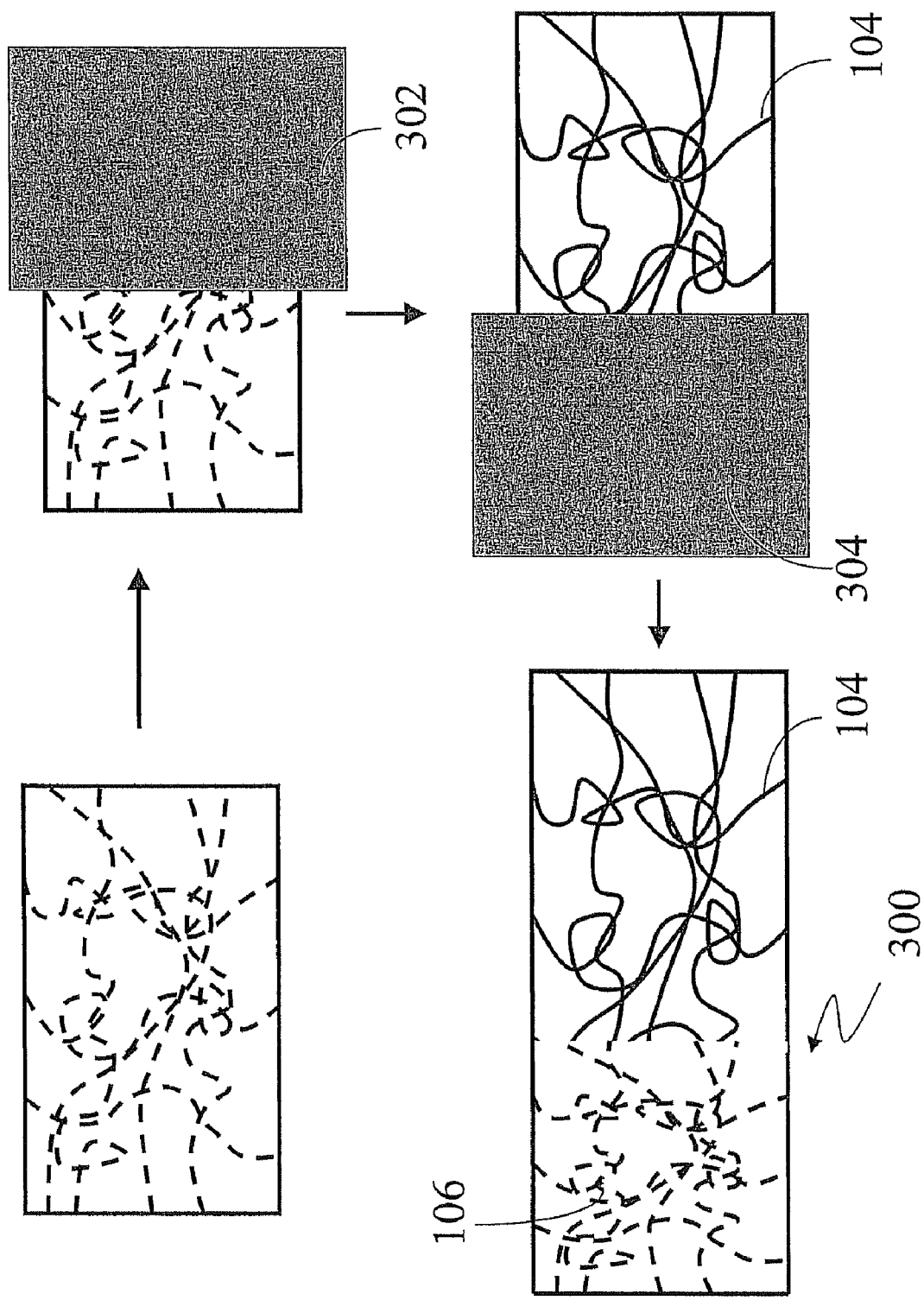
FIG. 3 depicts another exemplary method of manufacturing the polymeric composition, where the first crosslinked network and the second crosslinked network are not interpenetrating networks.

In yet another embodiment, depicted in the FIG. 3, the first crosslinked network is situated to be adjacent to the second crosslinked network, but both networks are part of the same mass of a polymeric composition 300. As can be seen in the FIG. 3, a first portion 302 of a polymeric mass is subjected to a first stress and/or a first strain level as a result of which the first crosslinked network 104 is formed. During or following the formation of the first crosslinked network, a second portion 304 of the polymeric mass is subjected to a second stress and/or a second strain level as a result of which the second crosslinked network 106 is formed. In the FIG. 3, the first crosslinked network 104 is adjacent to the second crosslinked network 106, but the two networks are not interpenetrating networks. While the embodiment depicted in the FIG. 3 reflects two crosslinked networks, a plurality of crosslinked networks can be located adjacent to one another in this manner.

The polymeric compositions thus manufactured display a variety of useful properties. When the polymeric composition thus manufactured is subjected to repetitive deformation (cyclic deformation) between the first strain level and the second strain level, reduced hysteresis, reduced fatigue, and a longer service life is advantageously obtained. This is because while the first crosslinked network is loading, the second crosslinked network is unloading. The polymeric composition also advantageously exhibits a reduced coefficient of thermal expansion compared with comparative polymeric compositions that do not have competing networks. Furthermore, the polymeric composition is resistant to swelling, consistent with its crosslink density, but with a lower modulus than that calculated (from equation (1)) for a given crosslink density.

In one embodiment, when the polymeric composition is deformed to a level less than the strain level at which it was crosslinked, a modulus less than calculated (from equation (1)) for a given crosslink density is obtained. In another embodiment, when the polymeric composition is deformed to a level greater than the strain level at which it was crosslinked, a modulus greater than that calculated (from equation (1)) from a given crosslink density is obtained.

As noted above, the polymeric composition comprises two or more competitive networks. When subjected to deformation at a level of strain that is less than the strain level at which it was cured, the first crosslinked network, exerts a force opposing the deformation. At the same time, the second crosslinked network exerts a force that reinforces the deformation. The net result is that the elastic modulus is reduced producing a softer polymeric composition than that which is produced by a polymeric composition that is not crosslinked under stress. Conversely, when the polymeric composition is subjected to a deformation at a strain level that is greater than the strain level under which it was cured, both the first and second elastomeric networks exert a force that opposes the deformation. The net result is that the elastic modulus is increased. Due to the competitive nature of the crosslinked networks, the modulus (at strain levels lower than the strain levels under which the polymeric composition was crosslinked) is less than the calculated modulus (from equation (1)) for a given crosslink density, and the modulus at strain levels greater than the strain level under which the crosslinked network was crosslinked is greater than the calculated modulus for a given crosslink density.

As noted above, when the polymeric composition is subjected to repetitive deformations at strain levels that are less the strain levels during crosslinking, reduced hysteresis, reduced fatigue and longer service life are obtained. The repetitive deformations are applied in the direction in which the network was strained during crosslinking. When the polymeric composition is deformed to a strain level that is less than the strain level under which it was cured, the first crosslinked network stretches and releases heat. At the same time, the second crosslinked network, relaxes and absorbs heat. The net result is a reduced thermal degradation of the polymeric composition, and therefore reduced hysteresis, reduced fatigue and longer service life.

In another embodiment, the polymeric composition displays a coefficient of thermal expansion in the direction of the deformation that is less than that typical for a given crosslink density of the polymeric composition. The coefficient of thermal expansion can thus be controlled at a constant crosslink density by varying the levels of strain during crosslinking, thereby affording reduced or negative coefficients of thermal expansion.

In another embodiment, the polymeric composition has a low modulus, and is resistant to swelling, which is unexpected. Both modulus and swelling resistance are generally proportional to crosslink density. Therefore, in commercially available elastomers it is difficult to obtain an elastomer with both a low modulus and a high swelling resistance. In these polymeric compositions having multiple competitive networks, however, the modulus is lower than the theoretical value (as calculated from equation (1)) of the crosslink density due to the competitive nature of the crosslinked networks. Thus, a polymeric composition displays a resistance to swelling that is consistent with its actual crosslink density. In one embodiment, the resistance to swelling is lower than that which would be proportional to its crosslink density due to the pre-stressing of the networks themselves, but with a lower modulus than that which is calculated from equation (1) for the crosslink density since the networks are competitive in that one is loading while the other unloading.

Thus, in summary, the elastic modulus of these polymeric compositions can be higher or lower than the theoretical value of elastic modulus that can be obtained based upon the crosslink density of the composition. The elastic modulus is dependent upon the magnitude and direction of deformation at the time of crosslinking as well as the amount of crosslinking in each stage of deformation. Thus, each of these variables (amount of deformation, direction of deformation, degree of crosslinking, and the like) can be used to control, the elastic modulus, coefficients of thermal expansion, and degree of swelling.

In general, a lower modulus than the theoretically obtainable value from equation (1) is exhibited when the polymeric composition is subject to a strain level that is less than the strain level at which it was cured (when the strain is a tensile strain). In one embodiment, the modulus of the polymeric composition can be up to 10% lower, specifically up to 20% lower, more specifically up to 50% lower, and more specifically up to 70% lower than the theoretically obtainable value from equation (1).

Conversely, a greater modulus than the theoretically obtainable value from equation (1) is exhibited when the polymeric composition is subject to a strain level that is greater than the strain level at which it was cured (when the strain is a tensile strain). In another embodiment, the modulus of the polymeric composition can be at least 20% higher, specifically at least 50% higher, specifically at least 80% higher, and more specifically at least 100% higher than the theoretically obtainable value from equation (1).

In summary, the polymeric compositions having competing networks manufactured as described above possess a variety of advantages over other comparative commercially available elastomers that do not have competitive networks. They exhibit reduced hysteresis, increased fatigue life, reduced heat dissipation, and longer service life than other comparative commercially available elastomers. They display a better balance of properties than other comparative commercially available elastomers. For example the polymeric compositions can be both resistant to swelling and have a lower modulus that that which would be theoretically predicted by Equation (1). The polymeric compositions disclosed herein can be advantageously used in gaskets, seals, treads, tires, and the like.

The following examples, which are meant to be non-limiting were conducted to demonstrate the method of manufacturing the polymeric composition disclosed herein. These examples also demonstrate some of the polymeric compositions disclosed herein.

EXAMPLES

Example 1

This example was conducted to demonstrate the performance of a polymeric composition manufactured by the aforementioned method. Tensile bars were cut from solution cast films of a KRATON® GRP6936 SEBS styrene-ethylene/butylene-styrene TPE, available from Kraton Polymers, Houston, Tex., and compounded with a UV curing agent. The UV curing agent was benzophenone purchased from Aesar. The benzophenone was 99% pure and was added in an amount of 5 wt %, based on the weight of the KRATON® GRP6936 SEBS styrene-ethylene/butylene-styrene TPE. Individual tensile bars were cured by exposure to UV light for 3 days in a WEATHER-O-METER® while subject to elongations of 0, 100, 200, and 300% to create the polymeric composition. The resulting polymeric composition thus has 4 competing networks. WEATHER-O-METER® is a trade name of Atlas, Chicago, Ill. The resulting samples were then allowed to relax to their equilibrium deformations. Stress-strain curves were then measured using a Universal Testing Machine—Instron 5500R, in the tensile mode as per ASTM D 638 Sample Type IV.

The samples cured at 50, 100, 200, and 300% elongation show a lower modulus at low extension ratios (below about 1.5), than the samples cured at 0% elongation. At high extension ratios (above about 1.5), the samples cured at 50, 100, 200, and 300% elongation show a pronounced strain hardening response (higher modulus) than the samples cured at 0% elongation. This behavior is consistent with a transition from a regime where the two networks are competitive (at an extension ratio below about 3), to a regime where they two networks are collaborative (at an extension ration above about 3).

Example 2

Example 1 was followed, except KRATON® GRP6926 SEBS (styrene-ethylene/butylene-styrene) thermoplastic elastomer was used in place of KRATON® GRP6936. The results are given in FIG. 5. As in Example 1, the samples cured at 50, 100, 200, and 300% elongation show a lower modulus at low extension ratios (below about 1.5), than the samples cured at 0% elongation. At high extension ratios (above about 1.5), the samples cured at 50, 100, 200, and 300% elongation show a pronounced strain hardening response (higher modulus) than the samples cured at 0% elongation.

Example 3

Tensile bars were cut from solution cast films of a SEBS thermoplastic elastomer with UV curing agent. Individual tensile bars were cured by exposure to UV light for 3 days in a WEATHER-O-METER® while subject to elongations of 0, 50, 100, 200, and 300%. Tensile properties of the cured materials were measured and are summarized in Table 1.

TABLE 1

| Elongation During Cure (%) | Permanent Set (%) | Residual Strain | Initial Modulus (MPa)[a] | Final Modulus (MPa) | Elongation at Break (%) | Toughness (MPa) |
|---|---|---|---|---|---|---|
| 0 | — | 1 | 10.63 | 2.6 | 130 | 3.23 |
| 50 | 54 | 1.37 | 9.35 | 3.7 | 150 | 5.46 |
| 100 | 52 | 1.52 | 7.55 | 4.6 | 133 | 0.25 |
| 200 | 60 | 2.30 | 7.03 | 7.1 | 103 | 3.33 |
| 300 | 50 | 2.50 | 6.88 | 8.8 | 118 | 4.58 |

[a]MPa denotes megaPascals.

Crosslinking at each elongation resulted in similar permanent set and residual strain values (residual strain is not same), which means that crosslink density is the same at each elongation, (also curing conditions were set to be same). Initial modulus is reduced for samples cured at 100% (50%) or greater elongation due to competitive network formation. The general trend for the samples cured at elongations above 100% (50%) is a higher final modulus, a higher (similar) elongation at break, and a higher toughness than the sample cured at 0% elongation.

Linear thermal expansion was measured on samples cured at 0, 50, 100, and 200%, 300%, elongation using a thermomechanical analyzer. The results are given in Table 2 below.

TABLE 2

| Elongation During Cure (%) | Initial Coefficient of Thermal Expansion (μm/° C.)[b] | Final Coefficient of Thermal Expansion (μm/° C.) |
|---|---|---|
| 0 | 2.72 | 8.30 |
| 50 | 1.56 | −6.79 |
| 100 | 1.11 | −9.92 |
| 200 | 0.98 | −10.11 |
| 300 | 0.09 | −10.54 |

[b]μm/° C. denotes micrometers per degree Centigrade.

As can be seen from Table 2, the samples crosslinked at 100 and 200% elongation transition from a positive coefficient of thermal expansion to a negative coefficient of thermal expansion. The transition occurs at about 50 to about 60° C. These results demonstrate that the coefficient of thermal expansion depends on the percent elongation during cure, and suggests that any coefficient of thermal expansion between 8.3 and −10.54 is achievable by adjusting the % elongation during cure.

Example 4

This example was conducted to demonstrate the performance of a polymeric composition manufactured by the aforementioned method. In this example, a double-networked styrene-ethylene-co-butylene-styrene (SEBS) tri-block copolymer is prepared by using physical cross-links from the hard styrenic phase as the first crosslinked network and curing it in a deformed state to achieve a second chemically crosslinked network. In order to compare the polymeric compositions formed from physical cross-links and from chemical cross-links, a double-networked ethylene-co-propylene-diene-monomer (EPDM) terpolymer was also prepared, by utilizing only the chemical cross-links from the unsaturation. The properties of these materials are compared at similar total crosslink times, but at different extension ratios before imposing the second crosslinked network.

The styrene-ethylene-co-butylene-styrene tri-block copolymer was a KRATON®. SEBS GRP6936. The styreneethylene-co-butylene-styrene tri-block copolymer contains 20% polystyrene in the end-blocks and 20% polystyrene in mid-blocks. The ethylene-co-propylene-diene-monomer terpolymer was obtained from Exxon Mobil®. The diene monomer present in the ethylene-co-propylene-diene-monomer was ethylene norbornene (ENB), at a concentration of 2.8% by weight.

Both styrene-ethylene-co-butylene-styrene tri-block copolymer and ethylene-co-propylene-diene-monomer were mixed with 5% benzophenone (Alfa Aesar), a UV crosslinking initiator, and melt blended using a Brabender batch mixer at 250° C. and 150° C. respectively. Films with a thickness of about 0.5 to about 1 millimeter were obtained by melt pressing at 260° C. for SEBS and at 150° C. for ethylene-co-propylene-diene-monomer. ASTM D638 type IV tensile samples were punched out of the films.

Polymeric compositions of styrene-ethylene-co-butylene-styrene tri-block copolymer were prepared by ultraviolet (UV) crosslinking using an UV crosslinking device manufactured by Atlas Suntest CPS+. The first crosslinked network results from the physical networks of the hard polystyrene block and is present immediately after processing (upon cooling below the glass transition temperature of the polystyrene). The second network was introduced by first uni-axially extending the sample to prescribed extension ratios ($\lambda^c$=1.5, 2, 3 and 4), and subsequently curing it using UV radiation. In this example, $\lambda^c$ is the extension ratio at curing, while $\lambda^t$ is the extension ratio during testing. This one-step UV curing was carried out after optimizing the curing conditions to a dosage power of 500 watts per square meter (W/m$^2$) at 25° C. for 8 hours to give a total dosage of 14400 kilojoules per square meter (kJ/m$^2$). The optimization was carried out by varying time and dosage in order to attain saturation in the modulus values of single network systems by varying time and dosage. Table 2a shows some of these features.

TABLE 2a

| Time (min) | Modulus (MPa) |
| --- | --- |
| 0 | 1.72 |
| 15 | 1.74 |
| 30 | 7.37 |
| 60 | 7.61 |
| 120 | 7.87 |
| 240 | 8.1 |
| 360 | 9.9 |
| 480 | 10.11 |
| 960 | 10.21 |

After curing, samples were allowed to relax back to their equilibrium state. The ethylene-co-propylene-diene-monomer polymeric compositions were prepared by only using UV crosslinking. The first network in the polymeric composition resulted from UV curing for 20 minutes at a dosage of 700 W/m$^2$ at 25° C. to give a total dosage of 840 kJ/m$^2$. The extension ratio was one ($\lambda^c$=1). The second network was introduced by uni-axially extending the pre-cured sample to prescribed extension ratios ($\lambda^c$=1.5, 2, 3 and 4), and subsequently curing it using UV radiation for 40 minutes at a dosage of 700 W/m$^2$ at 25° C. to give a total dosage of 1680 kJ/m$^2$. The curing characteristics of ethylene-co-propylene-diene-monomer were not optimized. After curing, samples were allowed to relax back to their equilibrium state.

The difference between the styrene-ethylene-co-butylene-styrene tri-block copolymer and the ethylene-co-propylene-diene-monomer polymeric composition samples is that the first crosslinked network in styrene-ethylene-co-butylene-styrene tri-block copolymer is a physical crosslink, while the second crosslinked network comprises chemical crosslinks, while the ethylene-co-propylene-diene-monomer polymeric composition comprises only chemical crosslinks. The second network in both cases is formed by chemical crosslinking. These polymeric composition samples were compared with samples cured at $\lambda^c$=1, which did not undergo any extension between the first and second cure.

The mechanism of free-radical crosslinking and oxidation in styrene-ethylene-co-butylene-styrene tri-block copolymer has been investigated and it was found that upon exposure to UV, both styrenic and olefinic phases undergo degradation, resulting in discoloration and loss of properties. Rapid hydroperoxide growth was observed in the olefinic phase, with subsequent oxidation and end-chain scission at the boundary of the styrene-olefin phases. The growth and build-up of the hydroperoxide is very low, indicating that the reaction is confined to the surface layer of the polymeric material. Crosslinking reactions were also minimal. In order to stabilize the material and increase the crosslinking, a crosslinking initiator such as benzophenone was used. Using benzophenone can result in an increase in crosslinking in both styrenic as well as olefinic phases, and reduce the scission reactions. A photoinitiator such as benzophenone is used to crosslink the ethylene norbornene unsaturation.

Infra-Red Spectroscopy

Fourier Transform Infrared (FT-IR) spectroscopy was utilized to qualitatively determine the extent of crosslinking. Infrared spectra were obtained on a Perkin-Elmer Spectrum One FTIR spectrometer.

Mechanical Properties

Monotonic uniaxial tensile properties were determined using an Instron 4411 tensile test machine, at a constant crosshead speed of 20 millimeters per minute (mm/min) at 23° C. ASTM D 1708 test geometry was employed for all the samples used for mechanical testing. Samples were tested in the direction parallel to the direction of stretch during cure.

The engineering stress versus extension ratio curves were plotted for these polymeric compositions, where extension ratios ($\lambda^t$) were calculated based on the final equilibrium length of these polymeric compositions. These stress versus extension ratio curves were used to calculate the physically effective crosslink density, which contains a contribution attributed to chain entanglements and loose chain ends acting as crosslinks in rubber. The physically effective crosslink density was calculated according to the Mooney-Rivlin equation, shown in equation (3) below.

$$\nu = \frac{\sigma}{2\rho RT\left(\lambda^t - \frac{1}{\lambda^{t2}}\right)} \quad (3)$$

where $\nu$=the physically effective crosslink density; $\sigma$=the engineering stress; R=the universal gas constant; T=the absolute temperature; and $\lambda^t$=the extension ratio of the sample.

Dynamic Mechanical Analysis

Dynamic mechanical properties were determined using a Dynamic Mechanical Analyzer DMA 2980 (manufactured by TA Instruments) at a constant frequency of 1 hertz (Hz). Thin film samples were oscillated in the direction parallel to the stretch direction during cure, over a temperature range of −80° C. to 250° C., ramped at 5° C./min.

Thermo-Mechanical Properties

Thermo-mechanical properties, including the thermal stability under load and coefficient of thermal expansion, were studied using the film/fiber probe in TA instrument Thermo-Mechanical Analyzer (TMA) 2940CE, at constant load of 0.05 N and a heating rate of 3° C./min.

Extent of Crosslinking

Figure 6A:
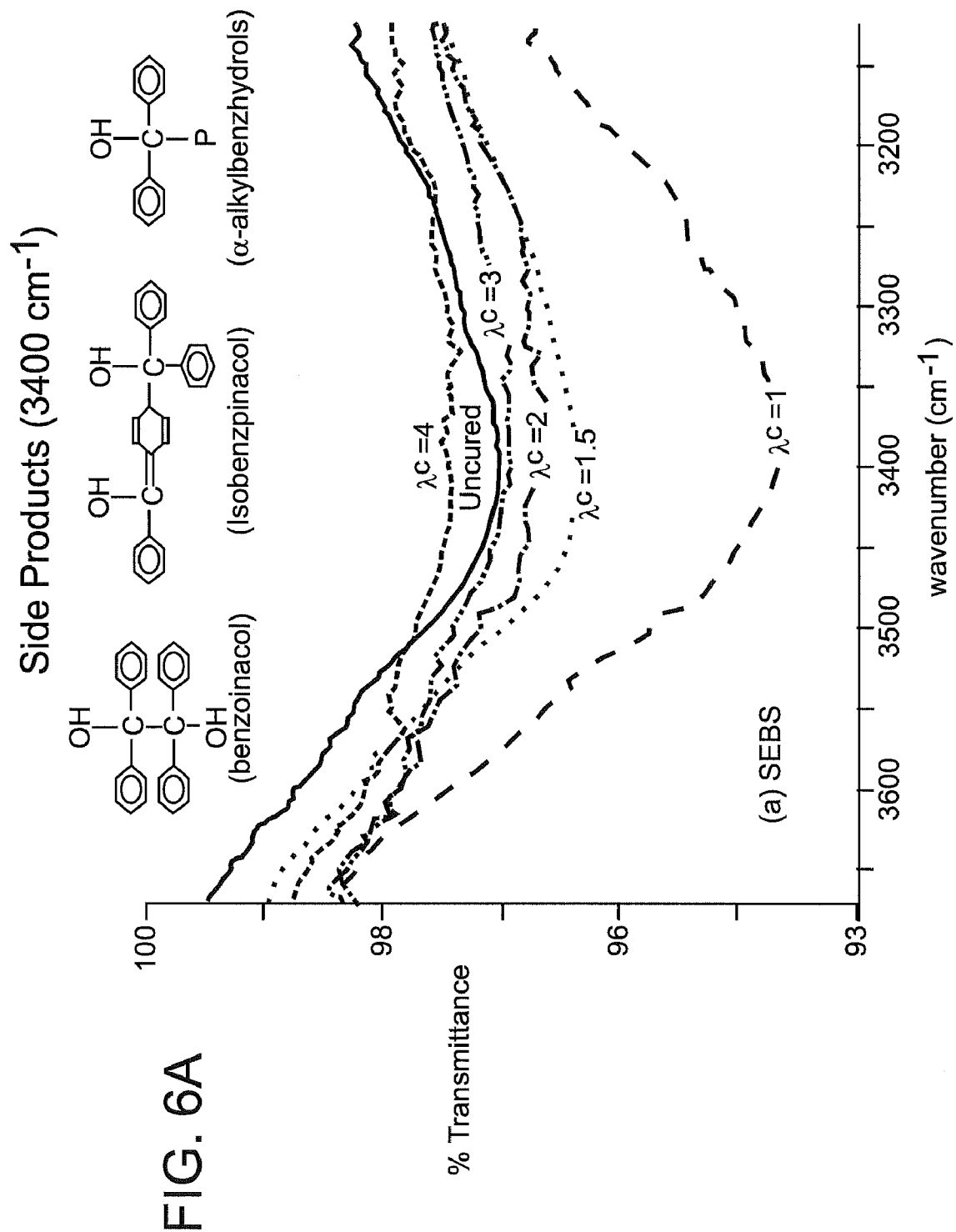
Figure 6B:
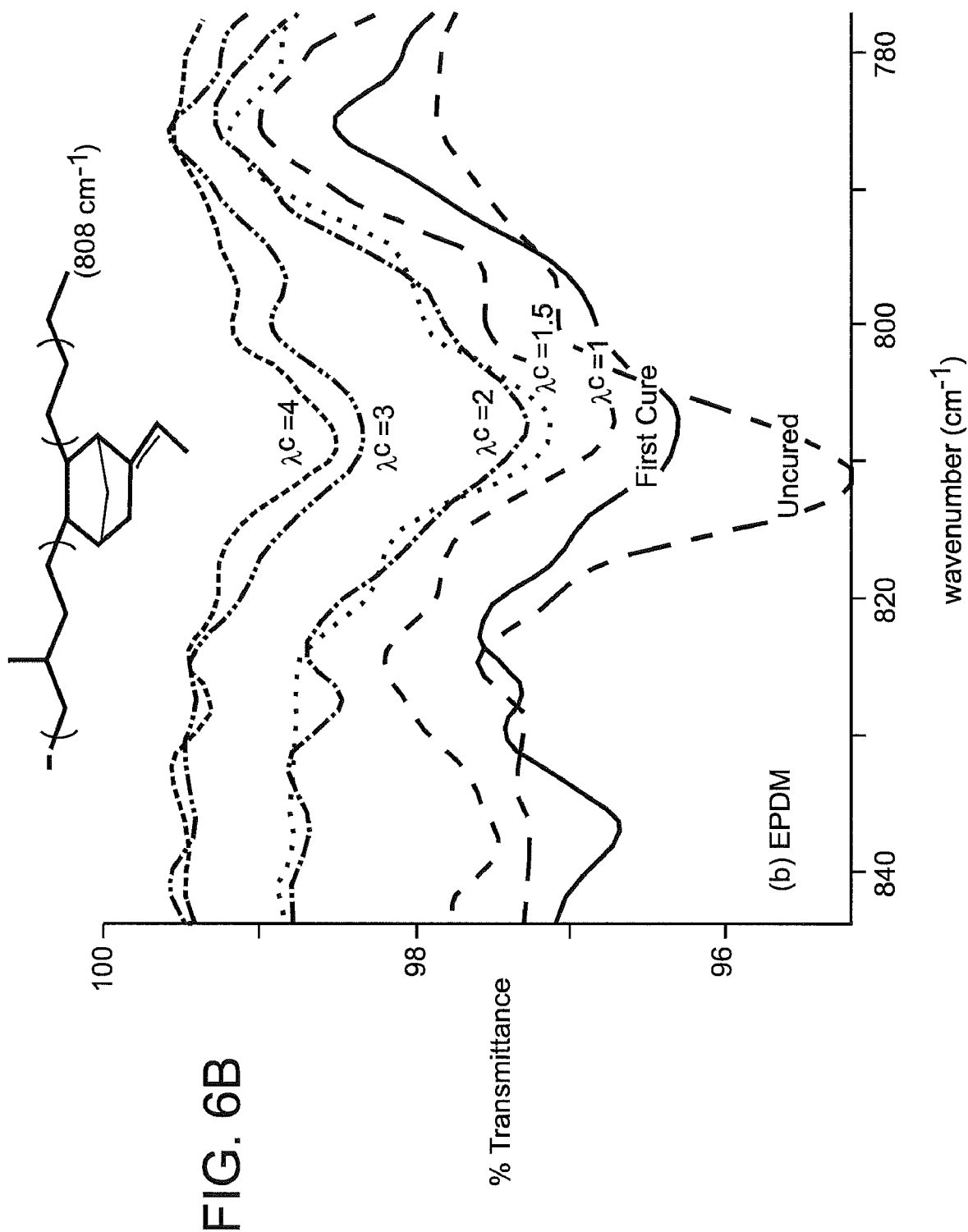
FIG. 6(B) shows the infrared data for ethylene-co-propylene-diene-monomer.

The extent of crosslinking in both styrene-ethylene-co-butylene-styrene tri-block copolymer and ethylene-co-propylene-diene-monomer was determined qualitatively using infrared spectroscopy. The peak chosen to compare the different samples of styrene-ethylene-co-butylene-styrene tri-block copolymer was at 3400 cm$^{-1}$, which corresponds to the hydroxyl-group based side products which are formed in competition with the crosslinking reaction. Hence, higher peak intensity corresponds to lower extent of crosslinking. The peak chosen, to compare the different samples of ethylene-co-propylene-diene-monomer was, at 808 cm$^{-1}$, which corresponds to the norbornene unsaturation. Hence, higher peak intensity corresponds to higher extent of crosslinking. In both systems, the chosen peak intensity decreases with an increase in $\lambda^c$, as shown in the FIG. 6. FIG. 6(A) show the infrared data for the styrene-ethylene-co-butylene-styrene tri-block copolymer while FIG. 6(B) shows the infrared data for ethylene-co-propylene-diene-monomer.

The increase in extent of curing can be attributed to decrease in thickness and increase in surface area available for UV crosslinking when the samples are stretched to a higher extension ratio during crosslinking ($\lambda^c$). As UV crosslinking is governed by the penetration depth, a lower thickness will lead to a higher extent of crosslinking. Polymer chain orientation causes crowding of chains and there is a higher probability of two chains combining together to form a crosslink than leading to scission reactions on the opposing side to the side being irradiated.

Tensile Response

The styrene-ethylene-co-butylene-styrene tri-block copolymer samples were stretched to various $\lambda^c$ and then cured. Whereas, ethylene-co-propylene-diene-monomer samples were partially cured and then extended to $\lambda^c$ before curing them further. The percent permanent set and the residual extension ratio of the various double-networked rubbers, along with their mechanical properties, are given in the Table 3 and Table 4. The residual strain and percent permanent set were calculated based on equations (4) and equation (5) respectively.

$$\text{Residual Strain} = \frac{l_s}{l_u} \quad (4)$$

$$\% \text{ Permanent Set} = \left(\frac{l_s - l_u}{l_x - l_u}\right) \times 100 \quad (5)$$

$l_s$ = Set length
$l_u$ = Unstretched Length
$l_x$ = Stretched Length

TABLE 3

| $\lambda^c$ | Permanent Set (%) | Residual Strain (%) | Initial Modulus (MPa) | Final Modulus (MPa) | Elongation at Break (%) | Toughness (MPa) |
|---|---|---|---|---|---|---|
| 1 | — | 100 | 10.63 | 2.6 | 130 | 3.23 |
| 1.5 | 72 | 136 | 9.35 | 3.7 | 150 | 5.46 |
| 2 | 57 | 157 | 7.55 | 4.6 | 133 | 4.25 |
| 3 | 56 | 212 | 7.03 | 7.1 | 103 | 3.33 |
| 4 | 49 | 248 | 6.88 | 8.8 | 118 | 4.58 |

TABLE 4

| $\lambda^c$ | Permanent Set (%) | Residual Strain (%) | Initial Modulus (MPa) | Final Modulus (MPa) | Elongation at Break (%) | Toughness (MPa) |
|---|---|---|---|---|---|---|
| 1 | — | 100 | 3.65 | 1.68 | 318 | 3.58 |
| 1.5 | 74 | 137 | 3.04 | 1.83 | 183 | 1.87 |
| 2 | 67 | 167 | 2.81 | 2.02 | 136 | 1.41 |
| 3 | 57 | 214 | 3.56 | 2.28 | 100 | 1.09 |
| 4 | 52 | 256 | 3.35 | 2.36 | 121 | 1.96 |

Figure 7A:
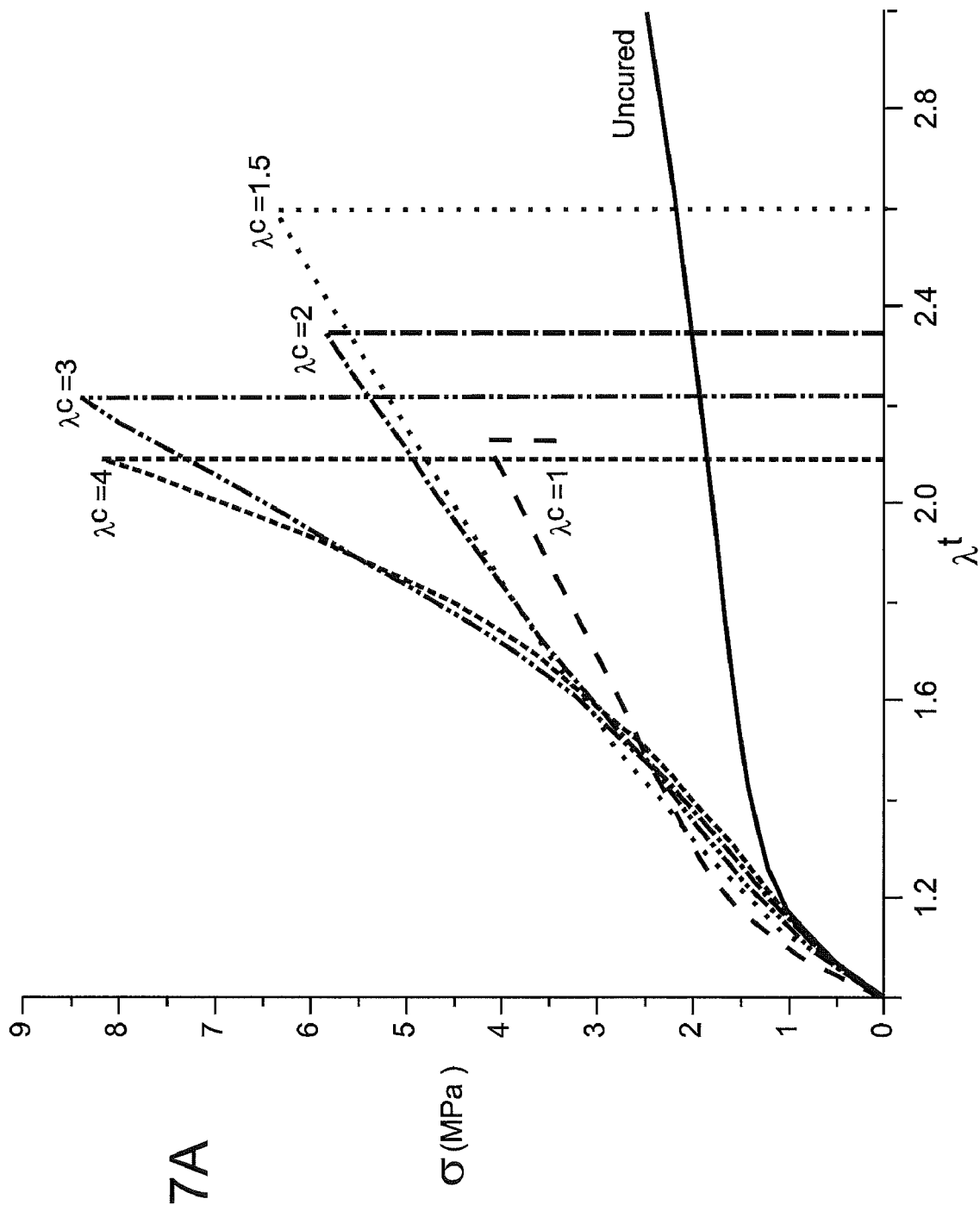
Figure 7B:
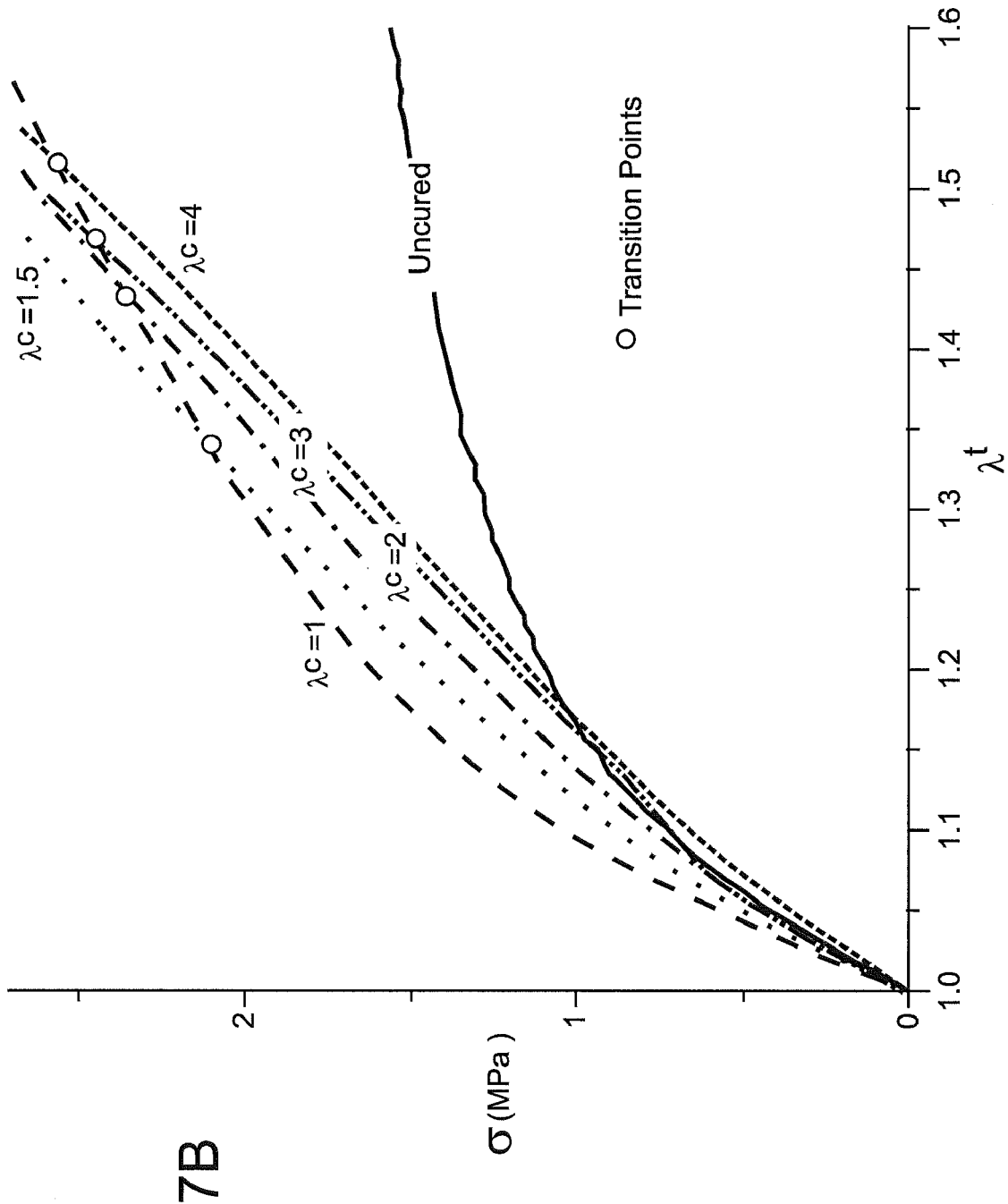
FIG. 7(B) shows a close-up in the low extension regime.

From Tables 3 and 4, it is evident that there is a significant improvement in overall mechanical properties of polymeric compositions formed in a stretched state as opposed to an unstretched state (where $\lambda^c=1$). FIG. 7 shows uniaxial stress versus $\lambda^t$ curves for the SEBS polymeric composition systems. Samples tested were single network (uncured) and polymeric compositions prepared at $\lambda^c=1, 1.5, 2, 3$ and 4. It is evident from FIG. 7(A) that, even having the same crosslink time in all the cured samples, the polymeric composition samples exhibit higher ultimate modulus compared to both the uncured and the $\lambda^c=1$ polymeric composition. This agrees with independent network hypothesis. Analyzing the data carefully, it is evident from FIG. 7(B) that there is a transition in modulus detectable in the polymeric composition elastomer which is absent in both the uncured sample and the sample cured at $\lambda^c=1$. This is due to the fact that, below the transition point, the two networks are in competition with each other, while above it, they become collaborative and act in parallel, leading to an increase in modulus. The position of the transition point is dependent on $\lambda^c$.

Compared to the uncured polymer, the samples cured at $\lambda^c=1.5$ and 2 show a lower modulus at lower $\lambda^t$ and a higher modulus at higher $\lambda^t$, but do not exhibit strain hardening at higher $\lambda^t$. Samples cured at $\lambda^c=3$ and 4 show an initial drop, as compared to the one cured at $\lambda^c=1$, followed by an increase in the modulus, along with strain hardening.

Figure 8A:
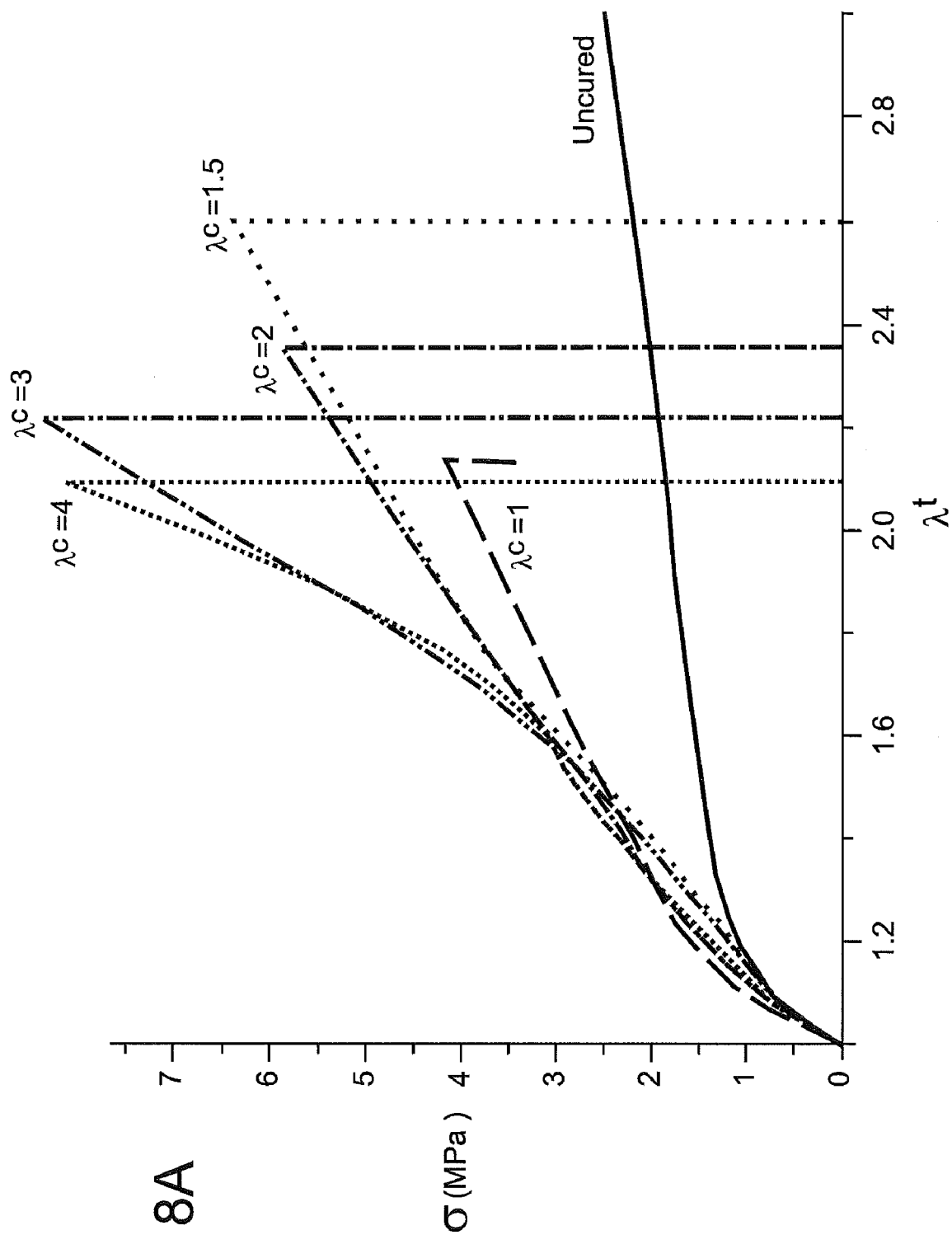
Figure 8B:
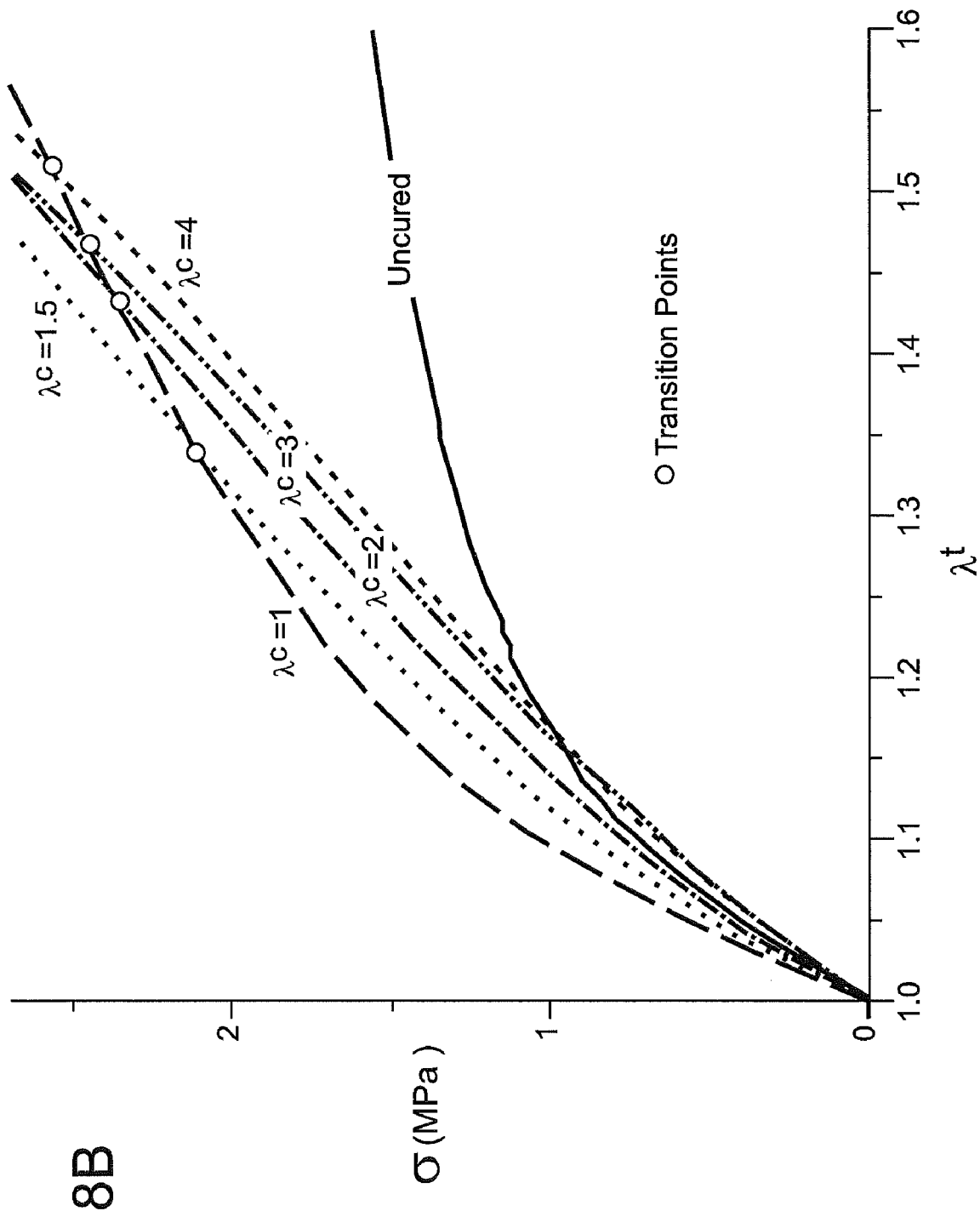
FIG. 8(B) shows a close-up in the low extension regime.

Similar behavior was observed in the case of ethylene-co-propylene-diene-monomer as shown in FIG. 8(A). There is an increase in modulus with increase in $\lambda^c$, at values of $\lambda^t$ beyond the transition points as shown in FIG. 8(B). Since the curing conditions of the ethylene-co-propylene-diene-monomer polymeric composition samples have not been optimized, the transition points are not easily separated and are very low due to incomplete curing.

Figure 9A:
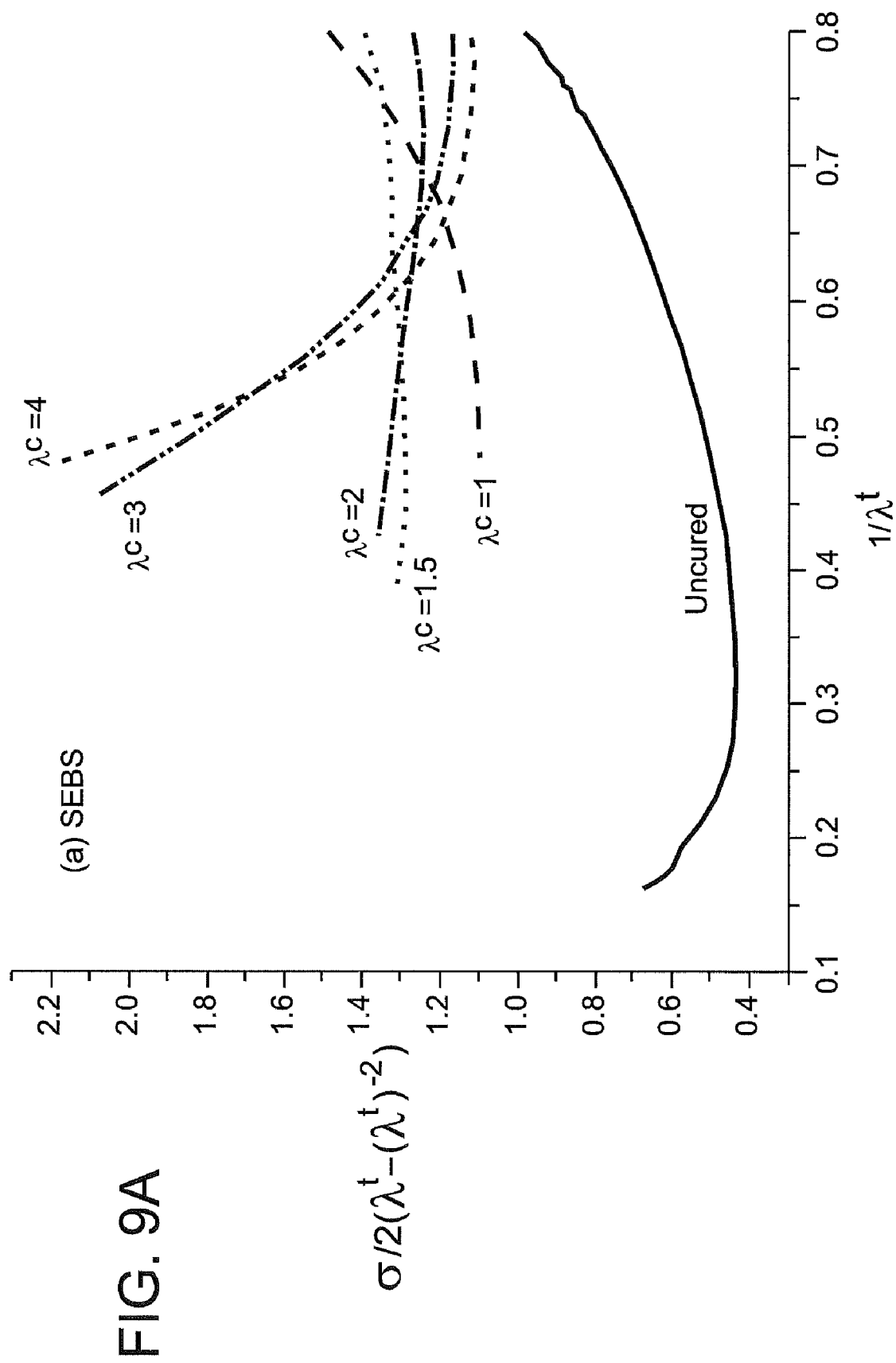
FIG. 9 is a Mooney-Rivlin plot of the (A) styrene-ethylene-co-butylene-styrene tri-block copolymer polymeric composition system and the (B) ethylene-co-propylene-diene-monomer polymeric composition system.
Figure 9B:
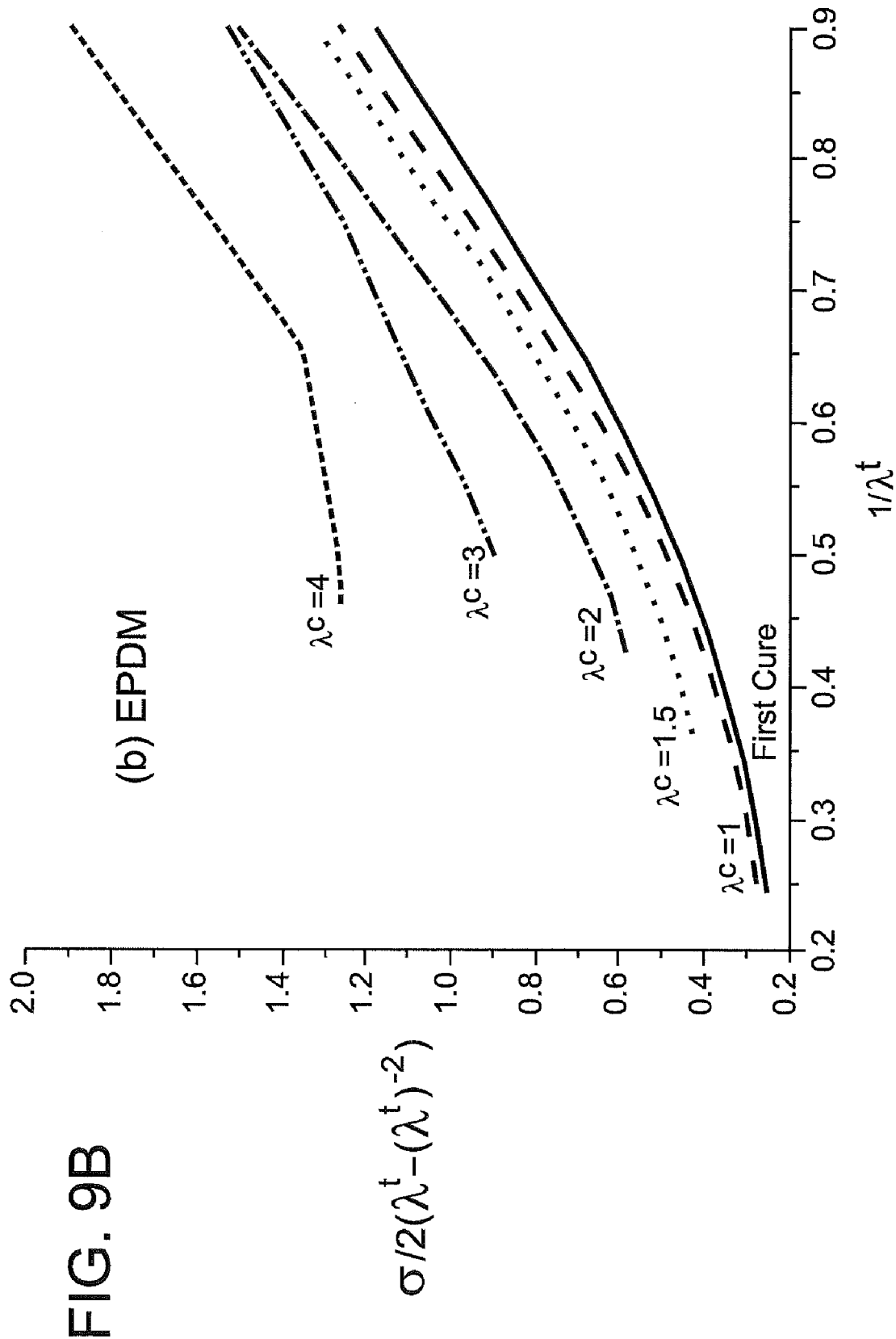

This non-linear behavior is also evident from the Mooney-Rivlin curve shown in FIG. 9, where the reduced stress $$\left[\frac{\sigma}{\left(\lambda^t - \frac{1}{\lambda^{t2}}\right)}\right]$$

is plotted against the inverse of $\lambda^t$. FIG. 9 is a Mooney-Rivlin plot of the (A) styrene-ethylene-co-butylene-styrene tri-block copolymer polymeric composition system and the (B) ethylene-co-propylene-diene-monomer polymeric composition system. It is observed that the styrene-ethylene-co-butylene-styrene tri-block copolymer polymeric composition elastomers are highly non-linear systems, whereas ethylene-co-propylene-diene-monomer samples are more linear. The styrene-ethylene-co-butylene-styrene tri-block copolymer samples show non-linear behavior at smaller $\lambda^t$ as compared to the uncured samples and the samples cured at $\lambda^c=1$, and this non-linear behavior increases with an increase in $\lambda^c$. The ethylene-co-propylene-diene-monomer polymeric composition samples show slight non-linearity with increase in $\lambda^c$.

Figure 10:
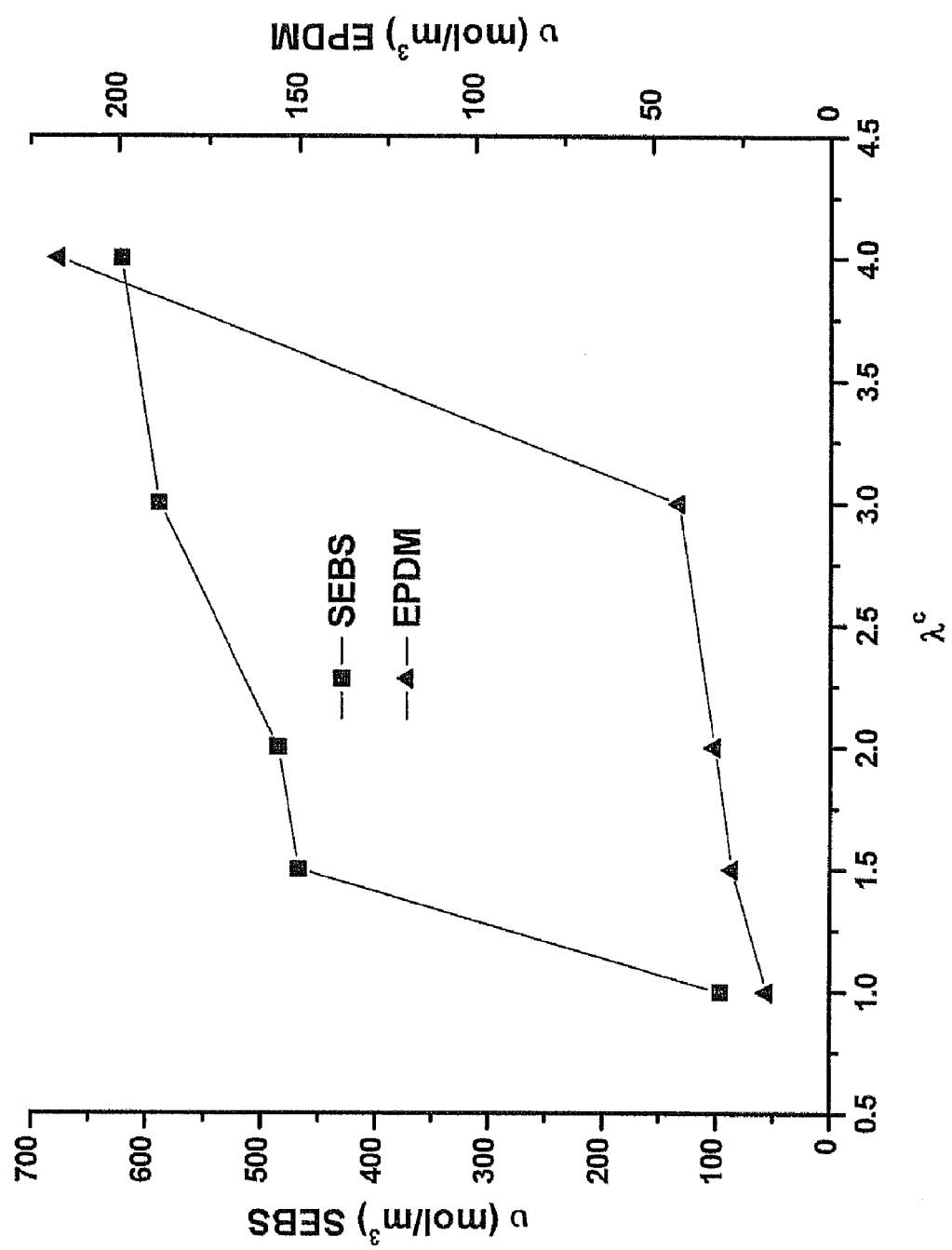
FIG. 10 is a physical effective cross-link density for the styrene-ethylene-co-butylene-styrene tri-block copolymer polymeric composition and the ethylene-co-propylene-diene-monomer polymeric composition calculated from the Mooney-Rivlin plot shown in FIGS. 7 and 8 respectively.

Based on the Mooney-Rivlin equation, the concentrations of physically effective crosslinks were calculated and are shown in FIG. 10. FIG. 10 is a physical effective cross-link density for the styrene-ethylene-co-butylene-styrene tri-block copolymer polymeric composition and the ethylene-co-propylene-diene-monomer polymeric composition calculated from the Mooney-Rivlin plot shown in FIGS. 7 and 8 respectively. The best fit was calculated based on the linear region of the Mooney-Rivlin plot. Even with the same curing dosages, the crosslink density increases with increase in $\lambda^c$. This is in agreement with the FTIR results and can be attributed to the increase in surface area and decrease in thickness with increase in $\lambda^c$. This also concurs with an increase in the polymer chain orientation, leading to higher probability of crosslinking reactions as compared to chain scission reactions.

Figure 11:
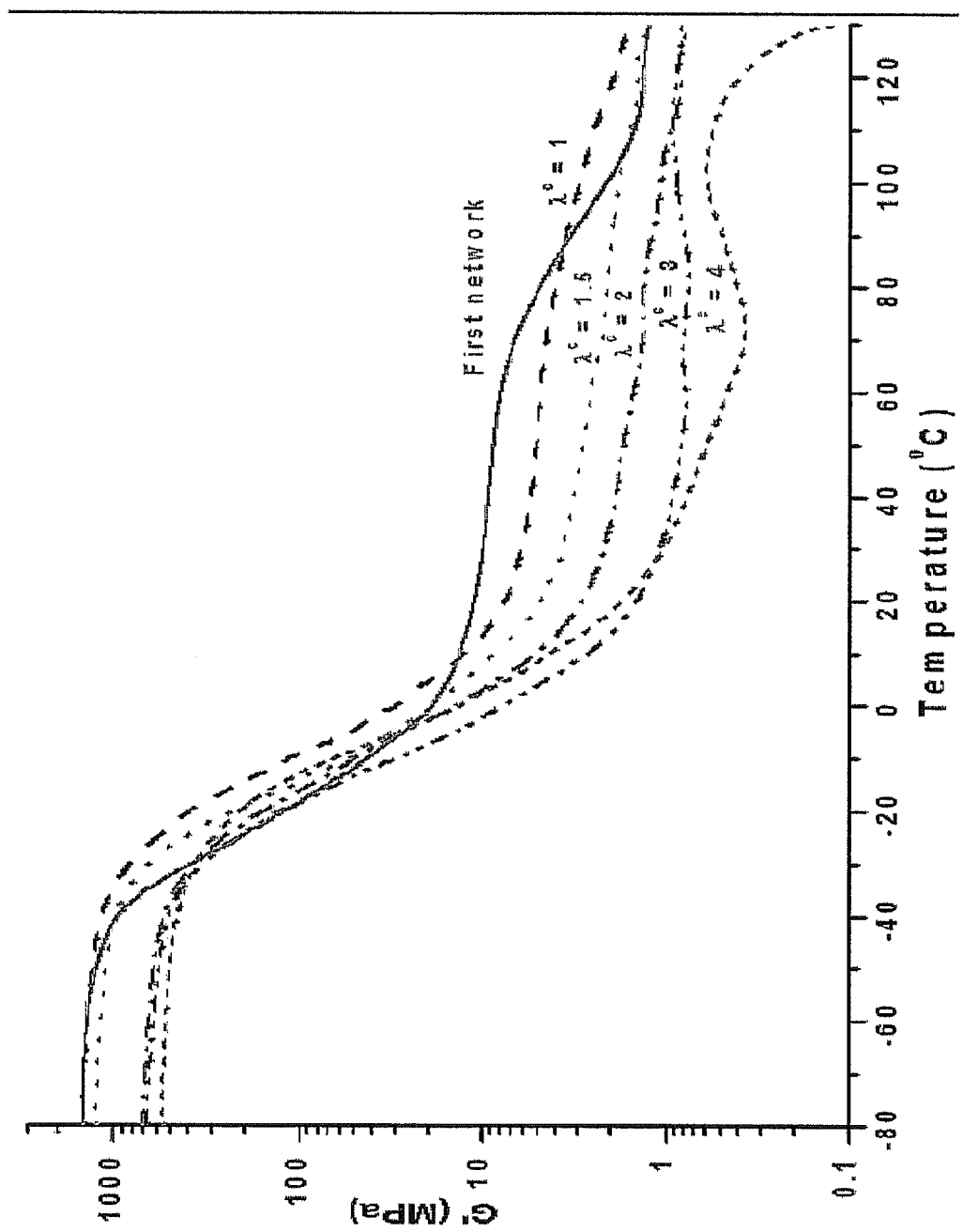
FIG. 11 is a graph of storage modulus versus temperature for the styrene-ethylene-co-butylene-styrene tri-block copolymer polymeric composition.
Figure 12:
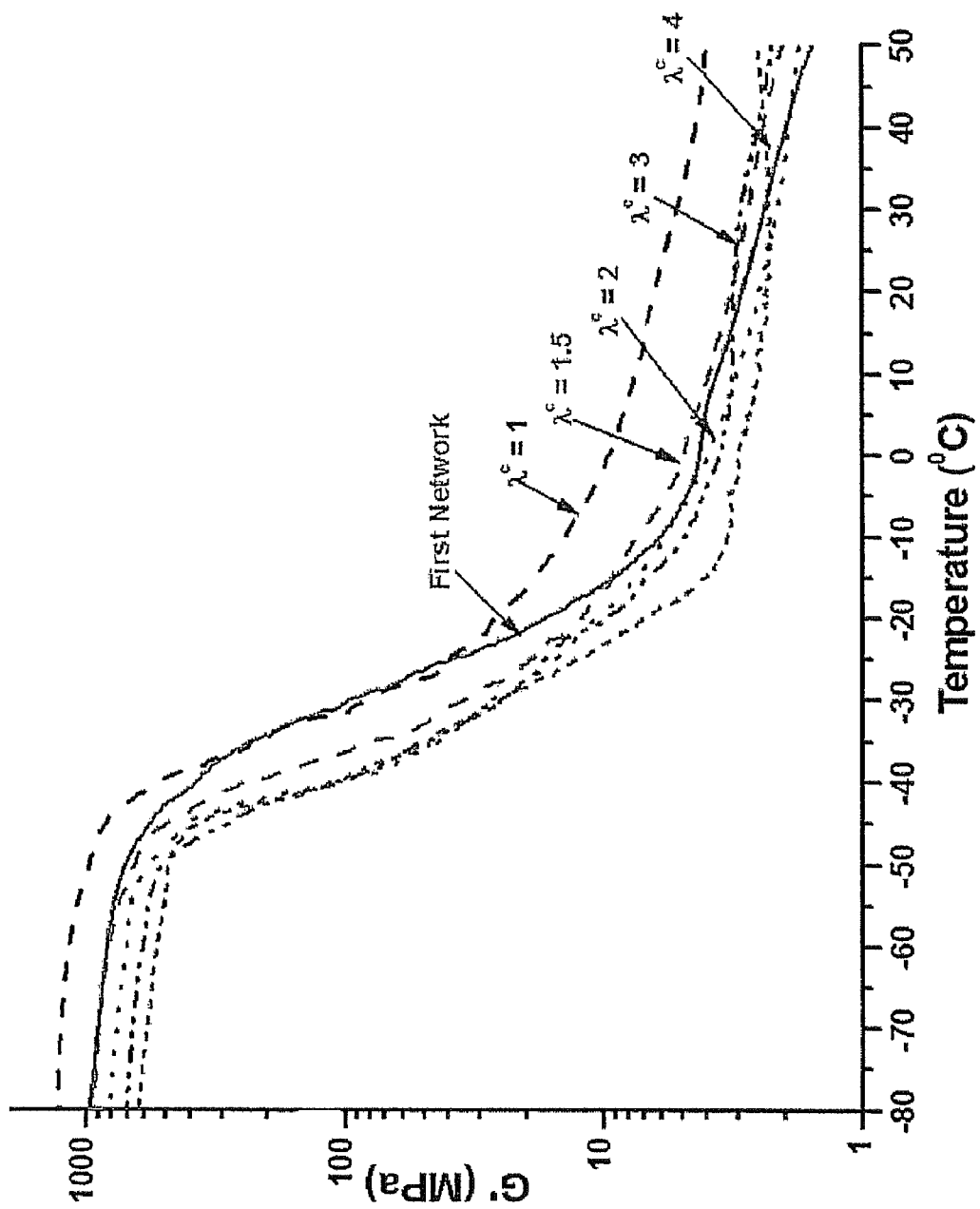
FIG. 12 is a graph of storage modulus versus temperature for the ethylene-co-propylene-diene-monomer polymeric composition.

The introduction of polymeric compositions changes the modulus of the material. The storage modulus values for the styrene-ethylene-co-butylene-styrene tri-block copolymer and ethylene-co-propylene-diene-monomer samples are plotted against temperature for samples cured at different $\lambda^c$, as shown in FIG. 11 and FIG. 12. FIG. 11 is a graph of storage modulus versus temperature for the styrene-ethylene-co-butylene-styrene tri-block copolymer polymeric composition. FIG. 12 is a graph of storage modulus versus temperature for the ethylene-co-propylene-diene-monomer polymeric composition.

The graphs can be divided into three distinct regions: the glassy region, the transition (leathery) region, and the rubbery region. The plateau modulus in the rubbery region is lower for double-networked samples cured at higher $\lambda^c$. This may be associated with the competitive nature of the two networks formed in the sample, and strained at a very small rate at low frequency.

Figure 13A:
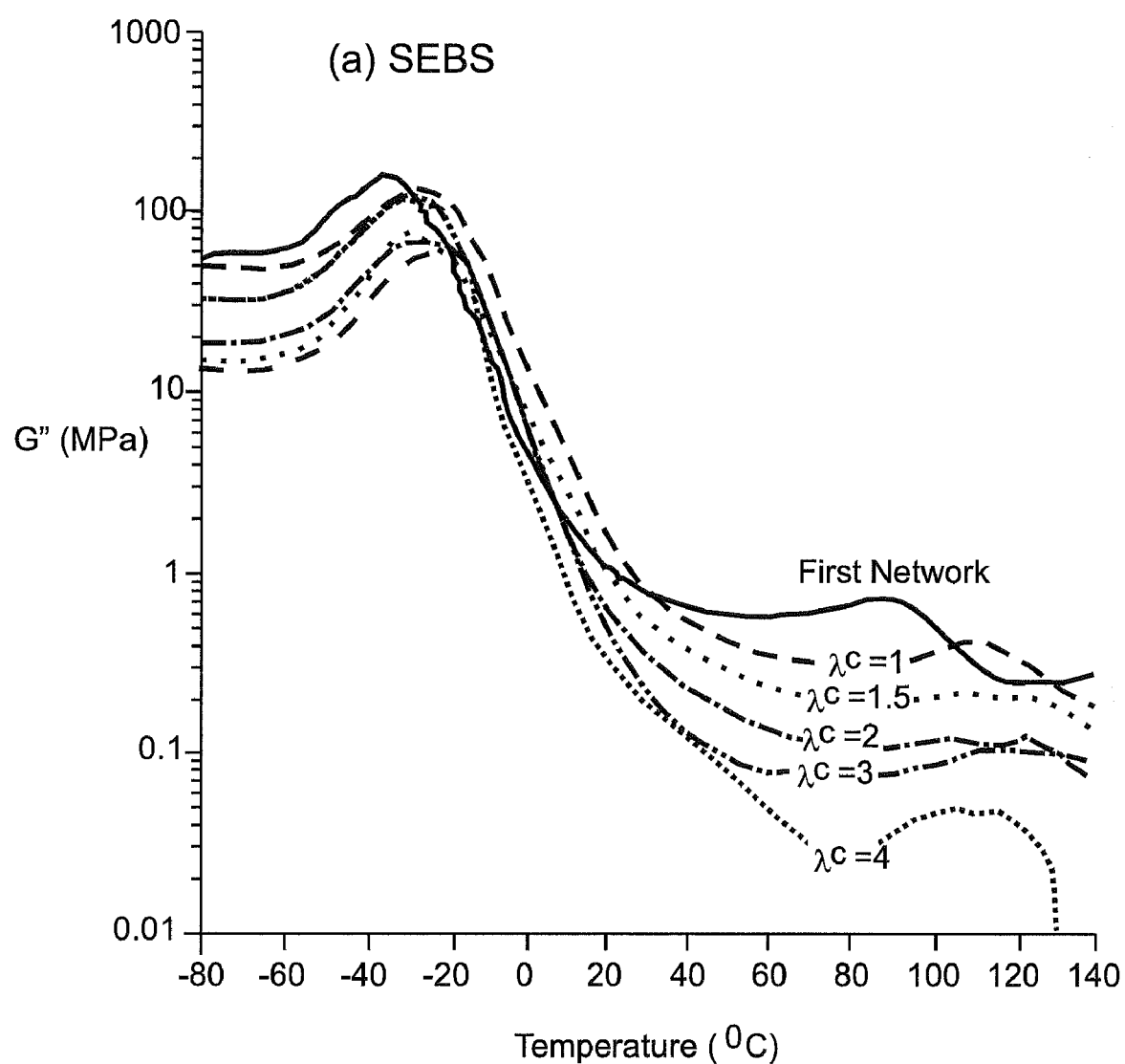
FIG. 13 is a graph of the loss modulus versus temperature of the (A) styrene-ethylene-co-butylene-styrene tri-block copolymer polymeric composition and (B) ethylene-co-propylene-diene-monomer polymeric composition as compared to corresponding polymeric compositions with $\lambda^c=1$.
Figure 13B:
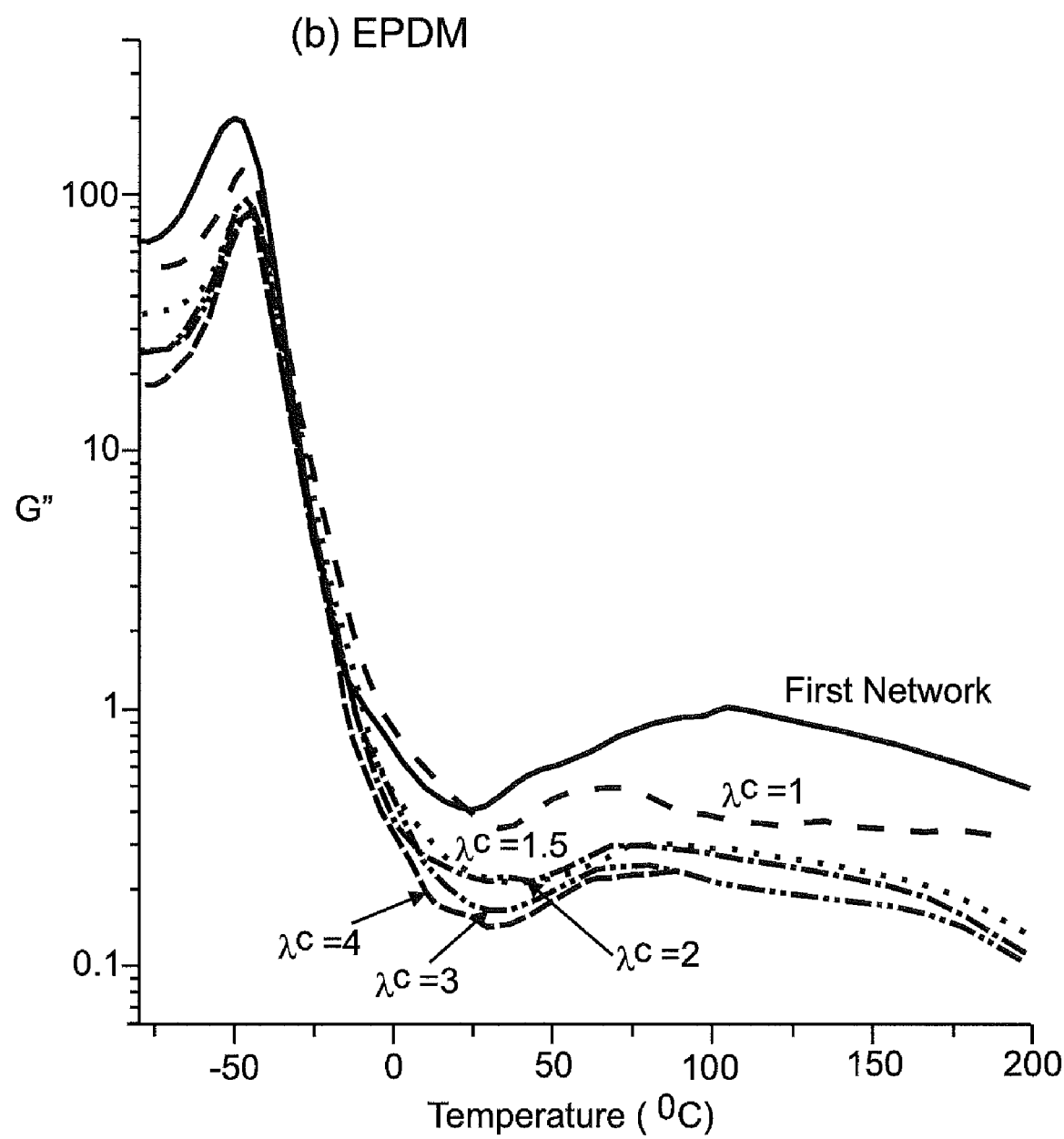

The loss modulus values versus temperature for the styrene-ethylene-co-butylene-styrene tri-block copolymer and ethylene-co-propylene-diene-monomer are shown in FIG. 13. FIG. 13 is a graph of the loss modulus versus temperature of the (A) styrene-ethylene-co-butylene-styrene tri-block copolymer polymeric composition and (B) ethylene-co-propylene-diene-monomer polymeric composition as compared to corresponding polymeric compositions with $\lambda^c=1$. In the rubbery regions of both the styrene-ethylene-co-butylene-styrene tri-block copolymer and ethylene-co-propylene-diene-monomer polymeric composition, the loss modulus of the networks decreases with increase in $\lambda^c$. Even in the glassy regime there is slight decrease in the loss modulus, which suggests that there is an increase in crosslinking with increase in $\lambda^c$. This also suggests that there is less viscous behavior of the samples with higher degree of crosslinking.

Figure 14A:
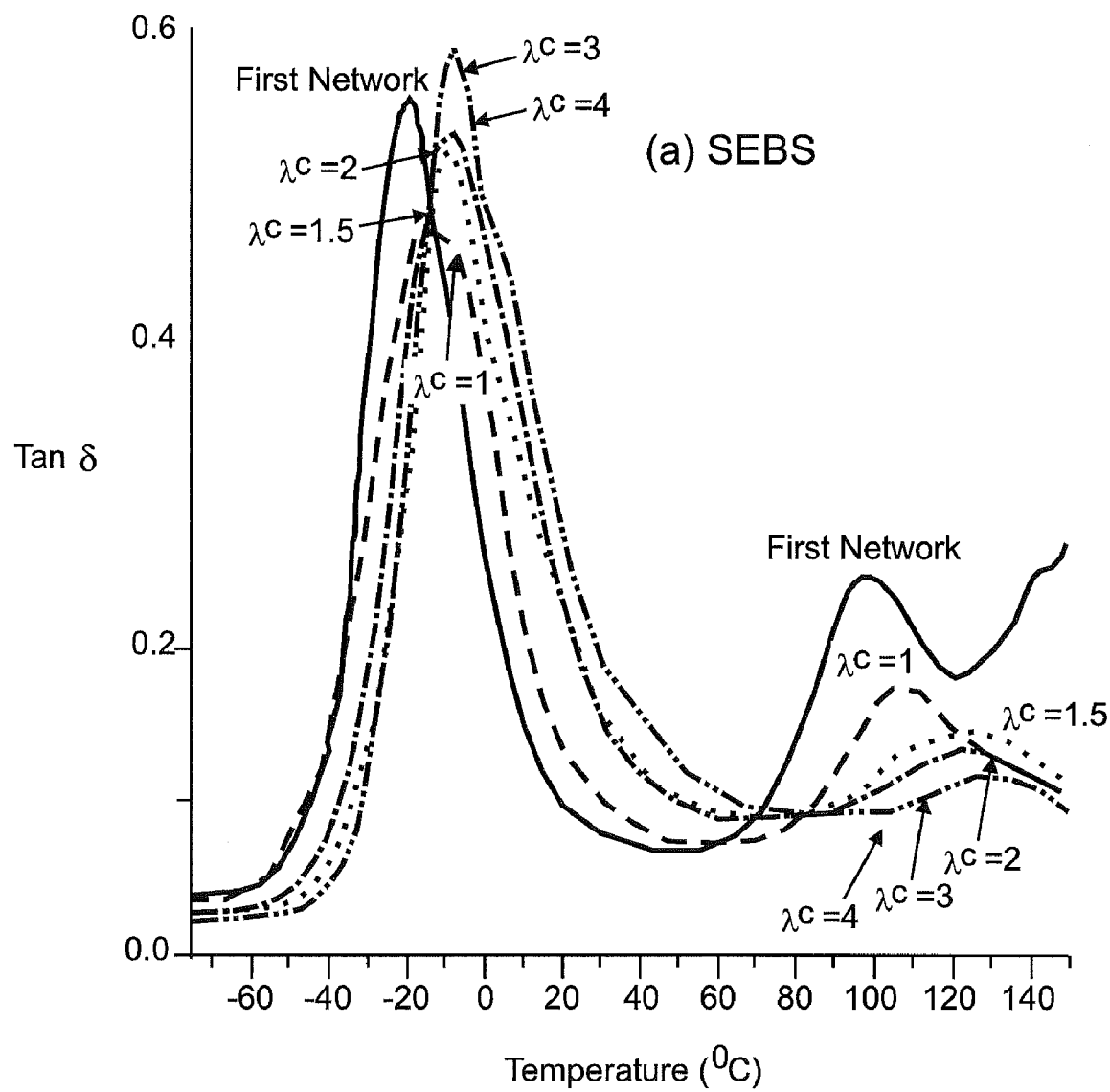
FIG. 14 is a graph of the tan δ versus temperature of the (A) styrene-ethylene-co-butylene-styrene tri-block copolymer polymeric composition and (B) ethylene-co-propylene-diene-monomer polymeric composition as compared to corresponding polymeric compositions with $\lambda^c=1$.
Figure 14B:
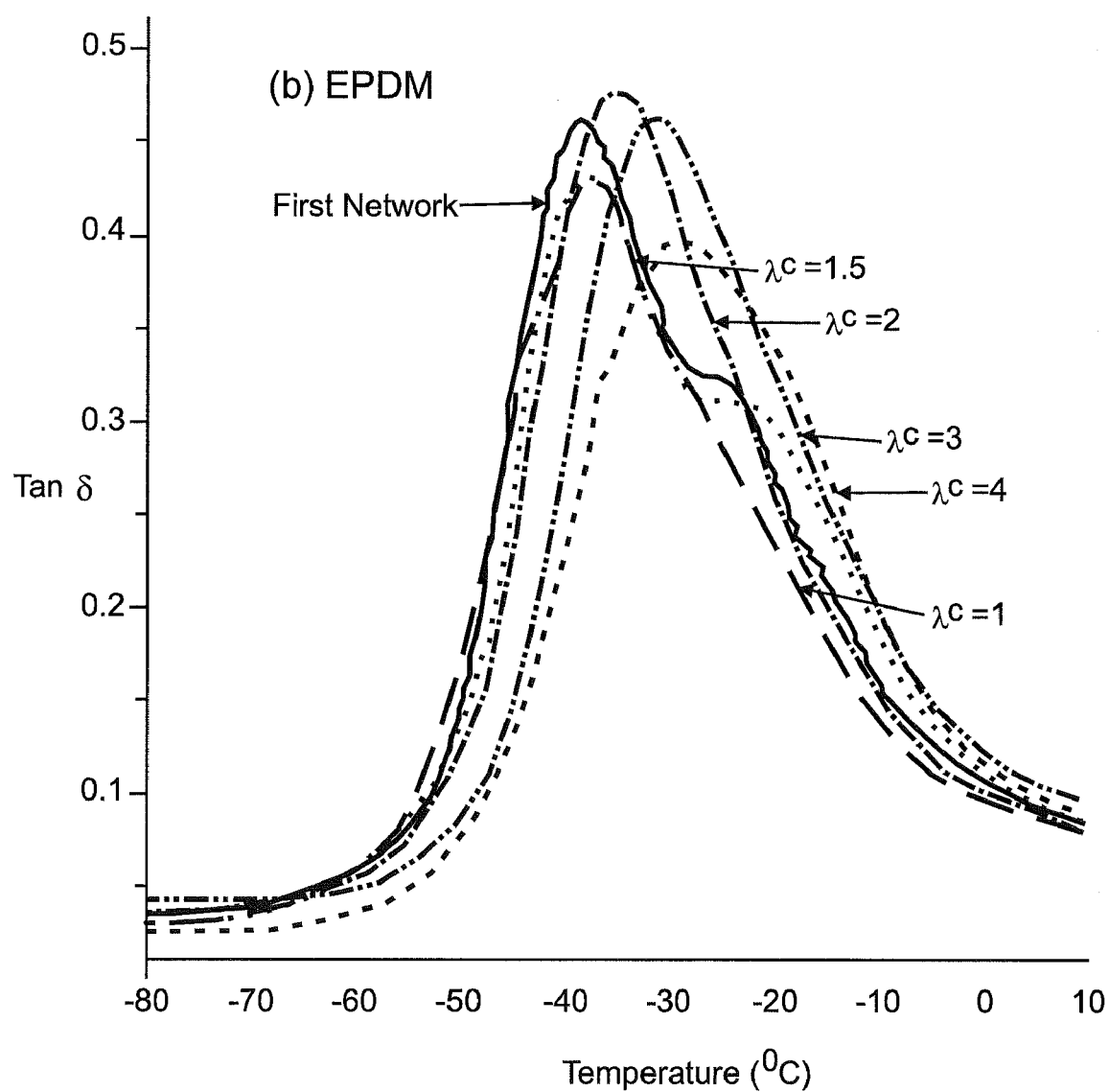

Crosslinking increases the glass transition temperature ($T_g$) of a polymer by introducing restrictions in the molecular motions of the chains. The plot of tan δ as a function of temperature for the styrene-ethylene-co-butylene-styrene tri-block copolymer and ethylene-co-propylene-diene-monomer is shown in FIG. 14. FIG. 14 is a graph of the tan δ versus temperature of the (A) styrene-ethylene-co-butylene-styrene tri-block copolymer polymeric composition and (B) ethylene-co-propylene-diene-monomer polymeric composition as compared to corresponding polymeric compositions with $\lambda^c=1$.

Figure 15:
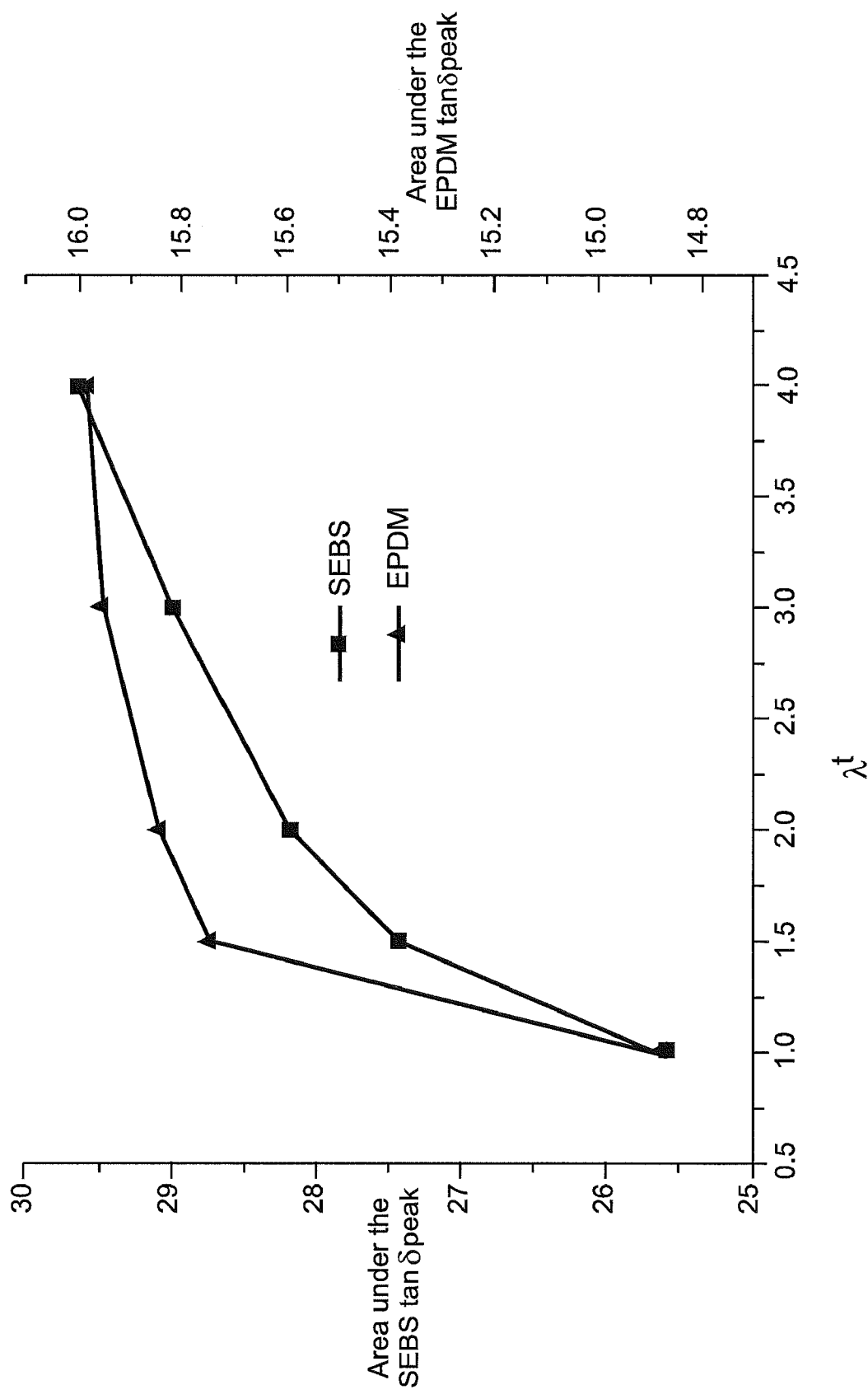
FIG. 15 depicts the increase in area under the olefenic tan δ peak for the styrene-ethylene-co-butylene-styrene tri-block copolymer polymeric composition and ethylene-co-propylene-diene-monomer polymeric composition with the increase in $\lambda^c$.

The peak of the curve is taken as the $T_g$. The $T_g$ values of both the polyolefin and the polystyrene phases in SEBS both show an increase with increase in crosslink density for the styrene-ethylene-co-butylene-styrene tri-block copolymer. The ethylene-co-propylene-diene-monomer also exhibits an increase in $T_g$. The peak area is a measure of mechanical damping ability and can be related to the service performance of the products. A slight increase in damping is observed in both the styrene-ethylene-co-butylene-styrene tri-block copolymer and the ethylene-co-propylene-diene-monomer as shown in FIG. 15, with an increase in $\lambda^c$. FIG. 15 depicts the increase in area under the olefenic tan δ peak for the styrene-ethylene-co-butylene-styrene tri-block copolymer polymeric composition and ethylene-co-propylene-diene-monomer polymeric composition with the increase in $\lambda^c$. This may be attributed to the competitive nature of the networks in the low strain regime, and may lead to better fatigue life. The tan δ and loss modulus curves appear to correlate with true crosslink densities, showing an increase in crosslinking with increase in $\lambda^c$. However the storage modulus follows the competitive behavior of the polymeric composition and hence decreases in the low $\lambda^t$ regime with an increase in $\lambda^c$.

Figure 16A:
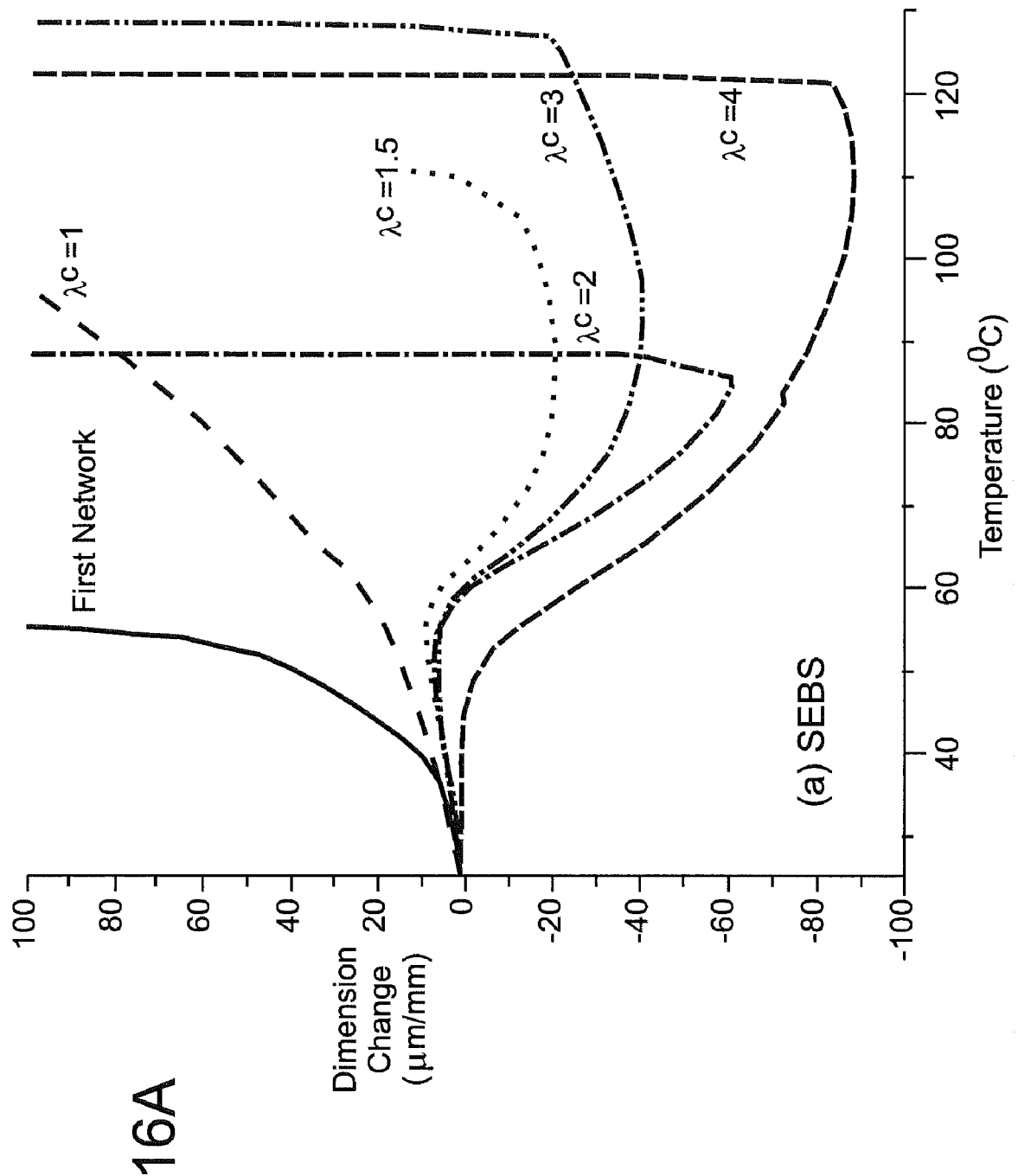
FIG. 16 shows TMA results for (A) the styrene-ethylene-co-butylene-styrene tri-block copolymer polymeric composition and (B) ethylene-co-propylene-diene-monomer polymeric composition cured at different $\lambda^c$ at constant load of 0.05N and temperature ramp rate of 3° C./min.
Figure 16B:
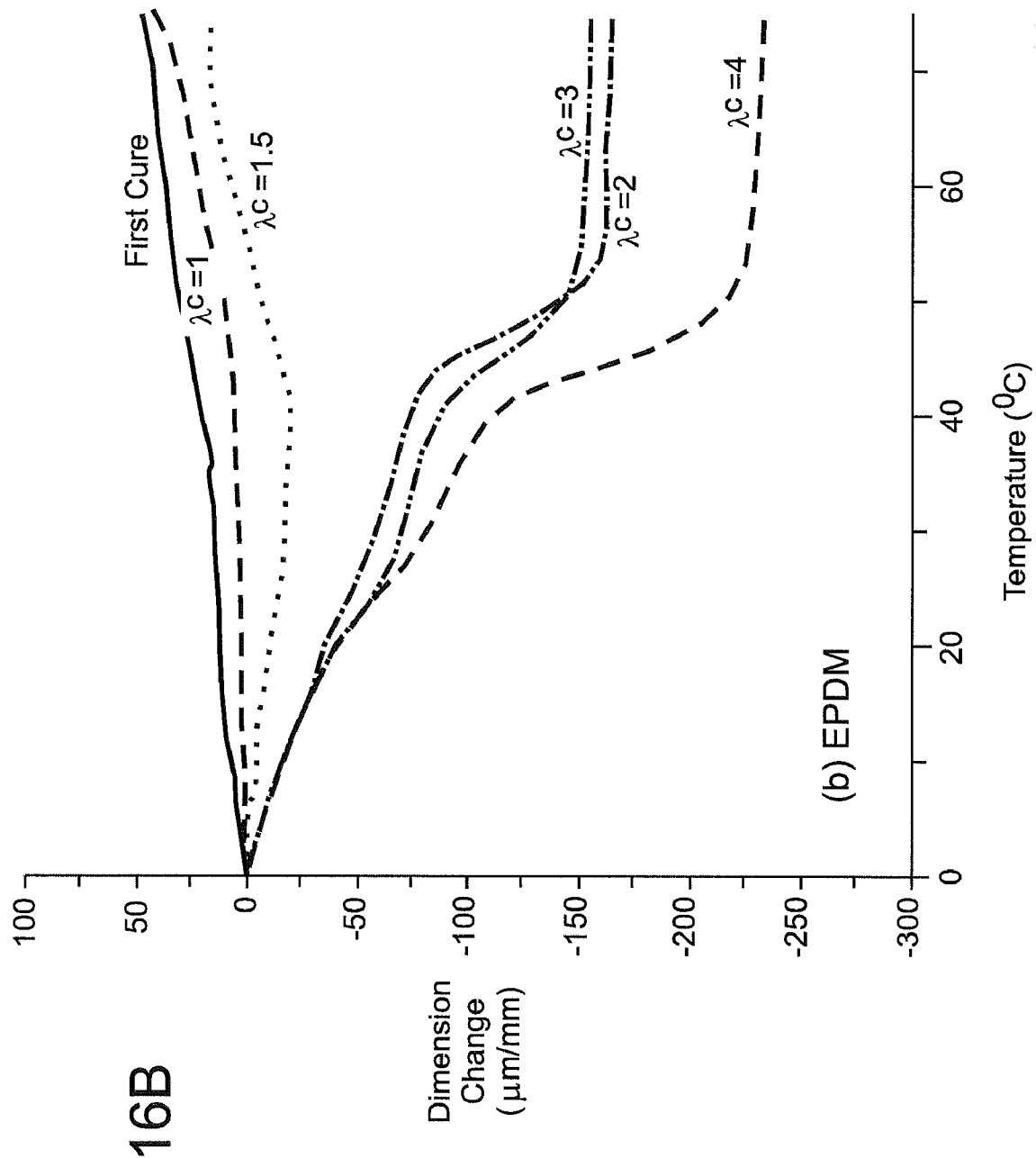

The dimensional change measured at constant load as a function of temperature is shown in FIG. 16. The coefficient of thermal expansion (CTE) was calculated using the following equation:

$$\alpha = \frac{\Delta L \times K}{\Delta T \times L} \qquad (5)$$

where α=coefficient of expansion (μm/mm° C.), L=sample length (mm), ΔL=change in sample length (μm), ΔT=change in temperature (° C.) and K=cell constant. FIG. 16 shows TMA results for (A) the styrene-ethylene-co-butylene-styrene tri-block copolymer polymeric composition and (B) ethylene-co-propylene-diene-monomer polymeric composition cured at different $\lambda^c$ at constant load of 0.05N and temperature ramp rate of 3° C./min.

It is evident that the curing at $\lambda^c=1$ leads to a decrease in the coefficient of thermal expansion (CTE) of both styrene-ethylene-co-butylene-styrene tri-block copolymer and the ethylene-co-propylene-diene-monomer samples and an improved thermal stability under load as compared to the uncured sample. Hence, it may be suitable for high temperature applications.

It is also evident that the samples cured at various $\lambda^c$ shows interesting behavior along with the increase in temperature. All the styrene-ethylene-co-butylene-styrene tri-block copolymer samples with $\lambda^c=1$ to 4 show a transition at 55 to 60° C., at which only the physically crosslinked uncured samples failed. The CTE values in micrometer per millimeter per degree centigrade (μm/mm° C.) for all the samples, before and after the transition point, are given in Table 5.

TABLE 5

| $\lambda^c$ | CTE before transition (μm/mm ° C.) | CTE after transition (μm/mm ° C.) |
| --- | --- | --- |
| 1 | 0.60 | 1.81 |
| 1.5 | 0.33 | −1.04 |
| 2 | 0.58 | −1.55 |
| 3 | 0.24 | −2.45 |
| 4 | 0.020 | −2.47 |

From the Table 5, the CTE values before the transition point are positive for the sample cured at $\lambda^c=1$. The samples cured at higher $\lambda^c$ show a decrease in CTE, and in the case of $\lambda^c=4$, it almost reaches zero. This can be attributed to that fact that the second network is leading to increase in anisotropy in the direction of stretch due to an increase in residual strain. They also show a transition at 55 to 60° C., beyond which a negative CTE is obtained. This may be due to the expansion of the polymeric composition elastomers before the transition point, with both the networks contributing in the expansion. However, beyond the transition point, where one of the networks fails, the second network tries to attain equilibrium, and following entropic behavior, contracts, which is seen as a negative CTE value. The negative CTE values also increase with increasing $\lambda^c$.

Similar behavior is observed in the case of the ethylene-co-propylene-diene-monomer. The polymeric composition elastomers show a negative CTE and there is a transition point at about 45° C., beyond which the slope decreases further. The CTE values of all samples, before and after the transition point, are given in Table 6.

TABLE 6

| $\lambda^c$ | CTE before transition (µm/mm ° C.) | CTE after transition (µm/mm ° C.) |
|---|---|---|
| 1 | 0.112 | 1.17 |
| 1.5 | −0.61 | 1.16 |
| 2 | −2.442 | −5.39 |
| 3 | −2.832 | −6.83 |
| 4 | −2.914 | −9.03 |

The samples do not show a contraction after failure of the first network because both networks are formed from chemical crosslinks. These polymeric compositions hence have stretched chains, frozen in the system, by introducing the second network in stretched state, which lead to contraction upon heating, even with higher crosslinking densities.

The styrene-ethylene-co-butylene-styrene tri-block copolymer and the ethylene-co-propylene-diene-monomer-based polymeric compositions have been formed and investigated. In both systems, a competitive regime and a collaborative regime have been identified, and the transition point is related to elongation of the sample during the formation of the second network. The storage modulus decreases in the competitive regime, even though crosslink density and $T_g$ increase and loss modulus decreases. This indicates the competitive regime is purely entropic and independent of the network changes, as observed between the physical networks for the styrene-ethylene-co-butylene-styrene tri-block copolymer and chemical networks for ethylene-co-propylene-diene-monomer. Constitutive equations governing this behavior are still to be investigated. These polymeric composition systems also form stiffer materials with higher crosslinking densities, yet show a lower or even a negative coefficient of thermal expansion, without addition of any filler. This is due to the entropic restrictions in this class of material. These materials can be very useful in many industrial applications such as lamination, where a balance of stiffness and expansion coefficient is required. They also have the potential to show improvement in other properties, such as fatigue and toughness, because of a high dependence on the entropic behavior of chains. These properties, along with the thermodynamics of these systems are still to be investigated.

From the aforementioned experiments and from the disclosure above it may be seen that the properties of the polymeric composition can be changed by changing the curing conditions. A range of unique properties can be obtained and these properties cannot be obtained in conventionally cured elastomers. In addition, combinations of unique properties are obtained in these polymeric compositions that cannot be found in other comparative polymeric compositions having the same compositional chemistry (i.e., the compositions are substantially identical) but which are not subjected to crosslinking at different levels of stress or strain.

In one embodiment, these polymeric compositions have an elastic modulus (after crosslinking) at tensile strains of up to about 50% that are up to about 50% less than the elastic modulus of a comparative polymeric composition (that is not subjected to crosslinking under extension) when both compositions have substantially similar amounts of crosslinking. In another embodiment, the elastic modulus for a comparative polymeric composition (that is not subjected to crosslinking under extension) is generally around 12 megapascals (MPa), while for polymeric compositions that are crosslinked at different stress or strains as disclosed herein, the elastic modulus at strains of up to 50% are about 3 to about 9 MPa. Exemplary polymeric compositions that display these properties are styrene butadiene styrene polymeric compositions where at least one of the crosslinked networks comprises physical crosslinks while the other crosslinked network comprises chemical crosslinks.

In one embodiment, these polymeric compositions have an elastic modulus (after crosslinking) at tensile strains greater than 50% that are at least 250% greater than the elastic modulus of a comparative polymeric composition (that is not subjected to crosslinking under extension) when both compositions have substantially similar amounts of crosslinking and both are subjected to the same level of strain. In another embodiment, the elastic modulus for a comparative polymeric composition (that is not subjected to crosslinking under extension) is generally around 3 MPa, while for polymeric compositions that are crosslinked at different stresses or strains as disclosed herein, the elastic modulus at strains of greater than or equal to about 250% is about 6 to about 15 MPa. Exemplary polymeric compositions that display these properties are styrene butadiene styrene polymeric compositions where at least one of the crosslinked networks comprises physical crosslinks while the other crosslinked network comprises chemical crosslinks.

In one embodiment, the glass transition temperature for the polymeric composition increases by around 150% as compared with conventionally cured elastomers. In particular, for a styrene butadiene styrene polymeric composition, where the glass transition temperature (Tg) is about −20° C. for conventionally cured elastomers (comparative polymeric composition that are not subjected to crosslinking under extension) it increases to about 0 to about 10° C. for the polymeric composition.

Toughness for the polymeric compositions is increased by about 25% to about 70% over the toughness of conventionally cured elastomers that have the same chemistry and the same crosslink density as the polymeric composition. In a styrene butadiene system that is crosslinked in the conventional manner (without being subjected to any strain) the toughness is about 1 to about 3 MPa, while for the polymeric composition crosslinked in the manner described herein, the toughness is about 4 to about 8 MPa.

In a dynamic mechanical thermal analysis test, the area under the tan δ curve increases by 20% for the polymeric compositions disclosed herein when compared with the conventionally cured elastomers (comparative polymeric composition that is not subjected to crosslinking under extension). Where the area under the tan δ curve is about 20° C. to about 25° C. for conventionally cured elastomers, it is about 30° C. to about 40° C. for the polymeric compositions which indicates a decrease in hysteresis in the polymeric compositions disclosed herein. Articles manufactured from the polymeric compositions can thus have a better fatigue life.

The linear coefficient of thermal expansion for the polymeric composition decreases by about 50% to about 100% as compared with the linear coefficient of thermal expansion for conventionally cured elastomers. Where the linear coefficient of thermal expansion is about 0.6 micrometer per millimeter-° C. (μm/mm° C.) for conventionally cured elastomers, it is about 0.01 to about 0.02 μm/mm° C. for the polymeric compositions disclosed herein. In another embodiment, the solvent uptake for these elastomers decreases by about 50 to about 100% when compared with conventionally cured elastomers. Where the swelling ratio (the ratio of the volume after swelling to the volume prior to swelling) is about 3.0 to about 6.0 for conventionally cured elastomers, it is only about 0.5 to about 1.5 for the polymeric compositions disclosed herein. No change in density of the elastomers is observed as compared with conventionally cured elastomers.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A polymeric composition comprising:
   a first crosslinked network; and
   a second crosslinked network; the first crosslinked network and the second crosslinked network being in operative communication with one another; wherein the first crosslinked network is crosslinked at a first stress and/or a first strain and the second crosslinked network is crosslinked at a second stress and/or a second strain; where the first stress and/or the first strain is different from the second stress and/or the second strain either in magnitude or direction; and further wherein either the first crosslinked network or the second crosslinked network has physical crosslinks, where the polymeric composition has an elastic modulus that is at least up to 50% less than a comparative polymeric composition at tensile strains of less than or equal to about 50%, an elastic modulus that is at least 250% greater than a comparative polymeric composition at tensile strains of greater than 50% and a linear coefficient of thermal expansion that is at least about 50% to about 100% lower than the comparative polymeric composition, where the comparative polymeric composition has the same chemical composition as the polymeric composition and has substantially the same crosslink density, except that the crosslinking in the comparative polymeric composition was conducted without application of any stress or strain.

2. The polymeric composition of claim 1, wherein the polymeric composition has an elastic modulus of about 3 to about 9 megapascals at tensile strains of less than 50%, an elastic modulus of about 6 to about 15 megapascals at tensile strains of greater than or equal to about 250% and a linear coefficient of thermal expansion of about 0.01 to about 0.02 micrometer per millimeter-° C.

3. The polymeric composition of claim 1, wherein a toughness for the polymeric compositions is increased by about 25% to about 70% over a toughness of the comparative polymeric composition.

4. The polymeric composition of claim 1, wherein a glass transition temperature for the polymeric composition is increased by an amount of up to 150% as compared with a glass transition temperature for the comparative polymeric composition.

5. The polymeric composition of claim 1, wherein the area under a tan δ curve is about 30° C. to about 40° C. for the polymeric composition.

6. The polymeric composition of claim 1, wherein the first crosslinked network acts in an opposing manner to a second crosslinked network during an application of stress to the polymeric composition.

7. The polymeric composition of claim 1, wherein the first crosslinked network acts in concert with a second crosslinked network during an application of stress to the polymeric composition.

8. The polymeric composition of claim 1, wherein the first crosslinked network is a chemically crosslinked network and the second crosslinked network is a physically crosslinked network.

9. The polymeric composition of claim 1, wherein the first crosslinked network and the second crosslinked network are both physically crosslinked networks.

10. The polymeric composition of claim 1, wherein the first crosslinked network and the second crosslinked network are interpenetrating networks.

11. The polymeric composition of claim 1, wherein the first crosslinked network and the second crosslinked network are not interpenetrating networks.

12. The polymeric composition of claim 1, wherein the first crosslinked network and the second crosslinked network are in physical communication with one another but are not interpenetrating networks.

13. The polymeric composition of claim 1, wherein the first crosslinked network and the second crosslinked network are adhesively bonded with one another.

14. The polymeric composition of claim 1, wherein a magnitude and/or direction of the first stress is different from the magnitude and/or direction of the second stress.

15. The polymeric composition of claim 1, wherein the first stress and/or the second stress is a compressive stress, a tensile stress, a shear stress, or a combination thereof.

16. The polymeric composition of claim 1, wherein the first stress and/or the second stress is a uniaxial stress or a multiaxial stress.

17. The polymeric composition of claim 1, wherein the first stress is a compressive stress while the second stress is a tensile stress.

18. The polymeric composition of claim 1, wherein a deformation of the polymeric composition results in the first crosslinked network absorbing heat from its surroundings while the second crosslinked network releases heat to its surroundings.

19. The polymeric composition of claim 1, wherein a modulus for the polymeric composition is greater or lesser than a theoretically calculated value of modulus for the same polymeric composition that has the same crosslink density, but has not been subjected to two different stress levels when crosslinked.

20. The polymeric composition of claim 1, wherein the polymeric composition when subjected to a stress level that is less than the first stress level and/or the second stress level displays a modulus that is less than a theoretical modulus value obtained from equation (2) for a given crosslink density and stress level $$G_r = \frac{\rho RT}{M_c} \quad (2)$$

where $G_r$ is the theoretical modulus in shear, $\rho$ is crosslink density of the polymeric composition, R is Avogadro's number, T is the temperature in degrees Kelvin, $M_c$ is the molecular weight between crosslinks and $\lambda$ is the amount of strain in a given direction.

21. The polymeric composition of claim 1, wherein the polymeric composition when subjected to a stress level that is greater than the first stress level and/or the second stress level displays a modulus that is greater than a theoretical modulus value obtained from equation (2) for an equivalent crosslink density and stress level $$G_r = \frac{\rho RT}{M_c} \quad (2)$$

where $G_r$ is the theoretical modulus in shear, $\rho$ is crosslink density of the polymeric composition, R is Avogadro's number, T is the temperature in degrees Kelvin, $M_c$ is the molecular weight between crosslinks and $\lambda$ is the amount of strain in a given direction.

22. The polymeric composition of claim 1, wherein the polymeric composition when subjected to repetitive deformations at a stress level that is lower than the stress level at which it was crosslinked displays a reduced hysteresis, a reduced fatigue and a longer service life when compared with a polymeric composition that was not crosslinked under stress; the repetitive deformations being conducted in the direction in which stress was applied during crosslinking.

23. The polymeric composition of claim 1, having a coefficient of thermal expansion that is less than the coefficient of thermal expansion for a comparative composition having the same crosslink density; the coefficient of thermal expansion being measured in the same direction as a direction that the first stress and/or the second stress is applied.

24. The polymeric composition of claim 1, wherein the polymeric composition has a higher swelling resistance and lower modulus than a comparative polymeric composition having the same crosslink density that is not crosslinked under stress.

25. The polymeric composition of claim 1, wherein the first stress level or the second stress level is zero.

26. The polymeric composition of claim 1, comprising an infinite number of crosslinked networks.

27. An article manufactured from the composition of claim 1.

28. A method comprising:
subjecting a polymeric composition to a first stress and/or a first strain level;
crosslinking the polymeric composition to form a first crosslinked network;
subjecting the polymeric composition to a second stress and/or a second strain level;
and crosslinking the polymeric composition to form a second crosslinked network;
where the first stress and/or first strain level is different from the second stress and/or strain level either in magnitude or direction; wherein the first crosslinked network and the second crosslinked network are in operative communication with one another and either the first crosslinked network or the second crosslinked network has physical crosslinks; and wherein the polymeric composition has an elastic modulus that is at least up to 50% less than a comparative polymeric composition at tensile strains of less than or equal to about 50%, an elastic modulus that is at least 250% greater than a comparative polymeric composition at tensile strains of greater than 50% and a linear coefficient of thermal expansion that is at least about 50% to about 100% lower than the comparative polymeric composition, where the comparative polymeric composition has the same chemical composition as the polymeric composition crosslinked under different stress and/or stain levels and has substantially the same crosslink density, except that the crosslinking in the comparative polymeric composition was conducted without application of any stress or strain.

29. The method of claim 28, wherein the first stress and/or the first strain level is of a different magnitude and/or direction from the second stress and/or the second stress level.

30. The method of claim 28, wherein the crosslinking for the polymeric composition is independently effected by sulfur vulcanization, semi-efficient vulcanization, efficient vulcanization, peroxide curing, UV irradiation, electron beam irradiation, X-ray irradiation, gamma ray irradiation, or a combination comprising at least one of the foregoing crosslinking means.

31. The method of claim 28, wherein the first stress level and/or the second stress level is brought about by the application of a tensile stress, a compressive stress and/or a shear stress to the polymeric composition.

32. The method of claim 28, wherein the first stress and/or the second stress is a uniaxial stress or a multiaxial stress.

33. The method of claim 28, wherein the polymeric mass is continually subjected to a plurality of stress and/or strain levels and crosslinked at each stress and/or strain level.

34. The method of claim 33, wherein the polymeric mass is continually stressed and continually crosslinked in a roll mill.

35. The method of claim 31, wherein the tensile stress, the compressive stress and/or the shear stress are uniaxially or multiaxially applied.

36. The method of claim 32, wherein the multiaxial stress is a biaxial stress.

37. An article manufactured by the method of claim 28.

* * * * *